July 19, 1938.   A. A. HODGKINS   2,124,507
AUTOMATIC GEAR SHIFTING
Filed June 17, 1932   11 Sheets-Sheet 1

INVENTOR
ALBERT A. HODGKINS
BY Frederick Griswold
ATTORNEY

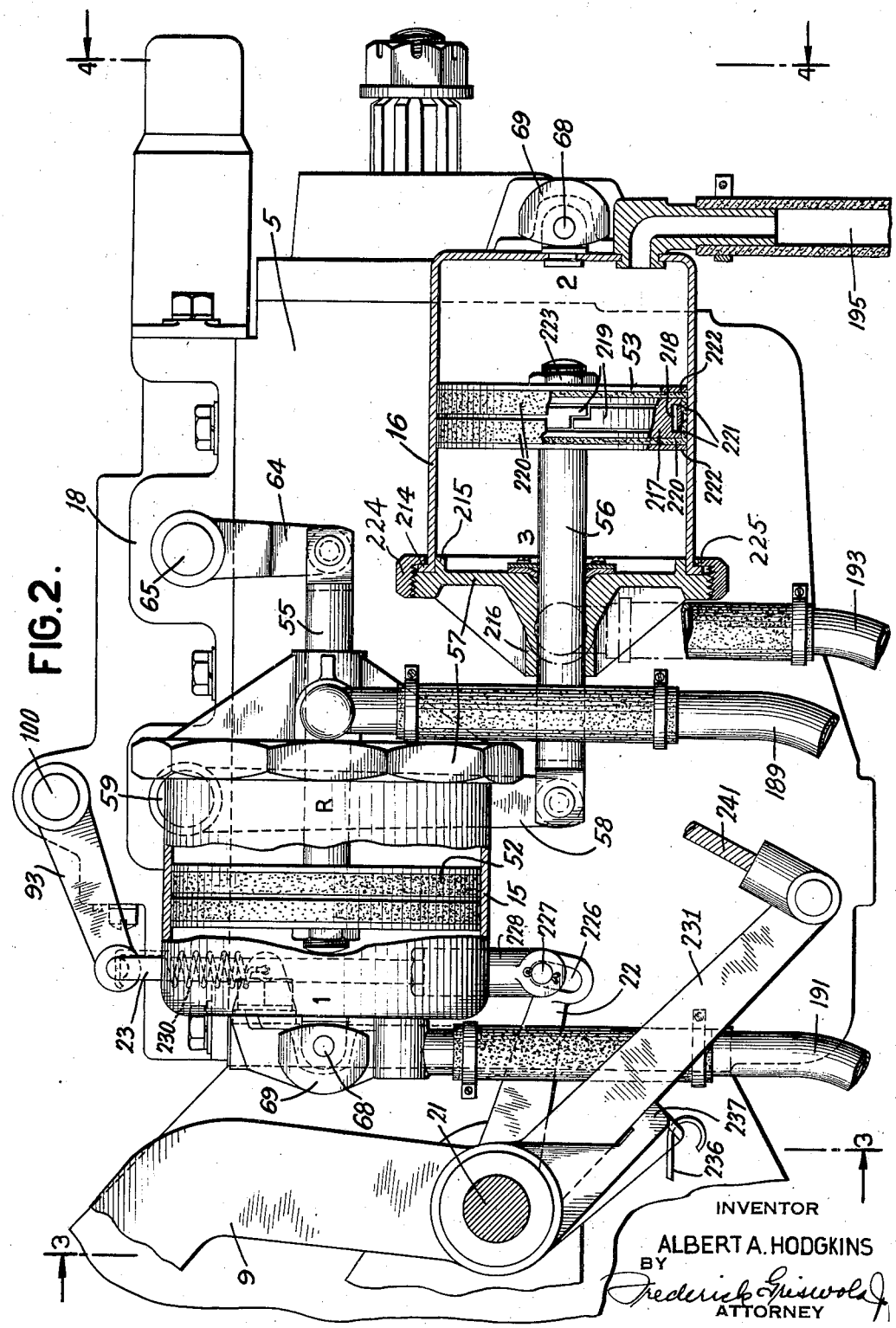

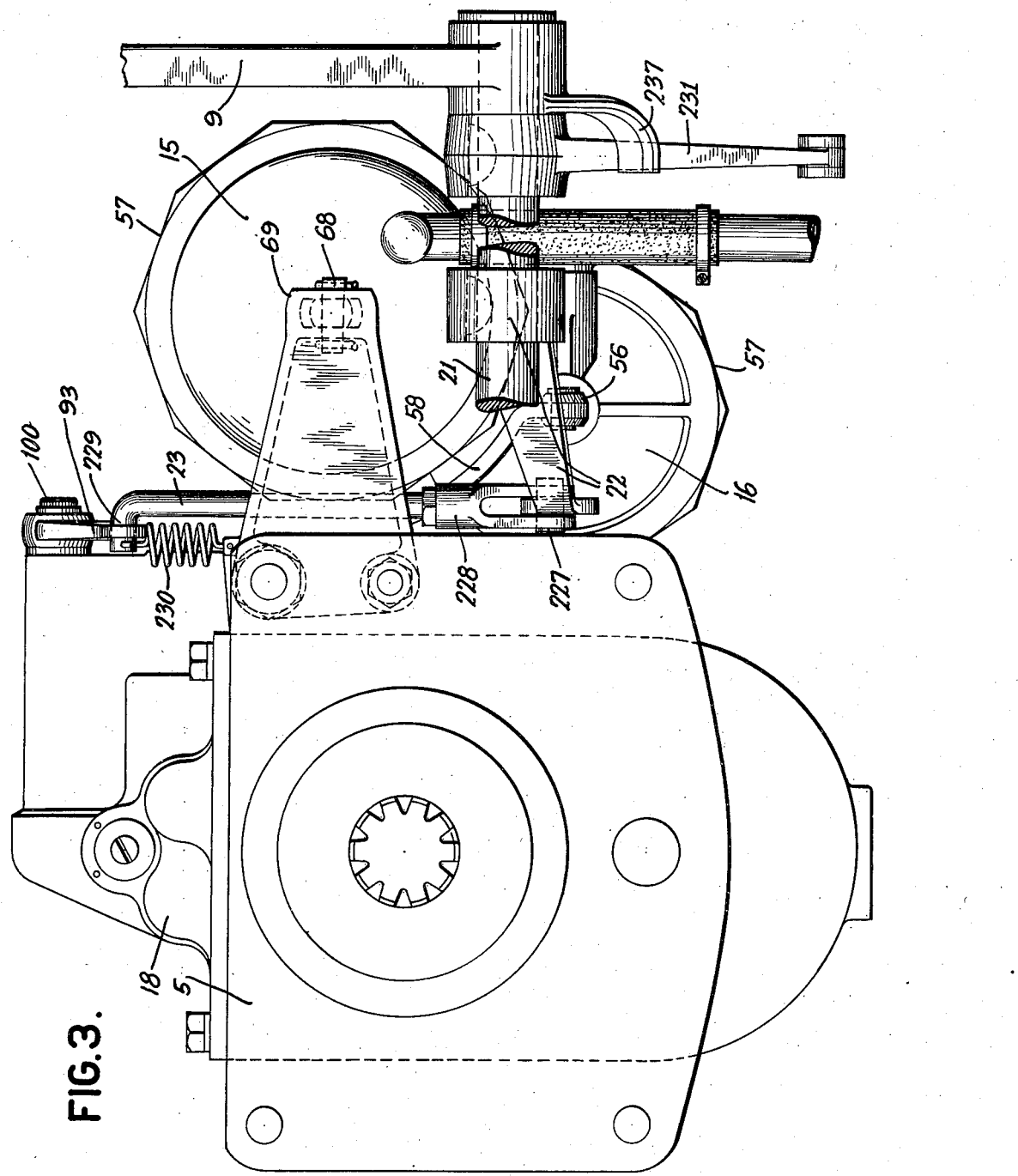

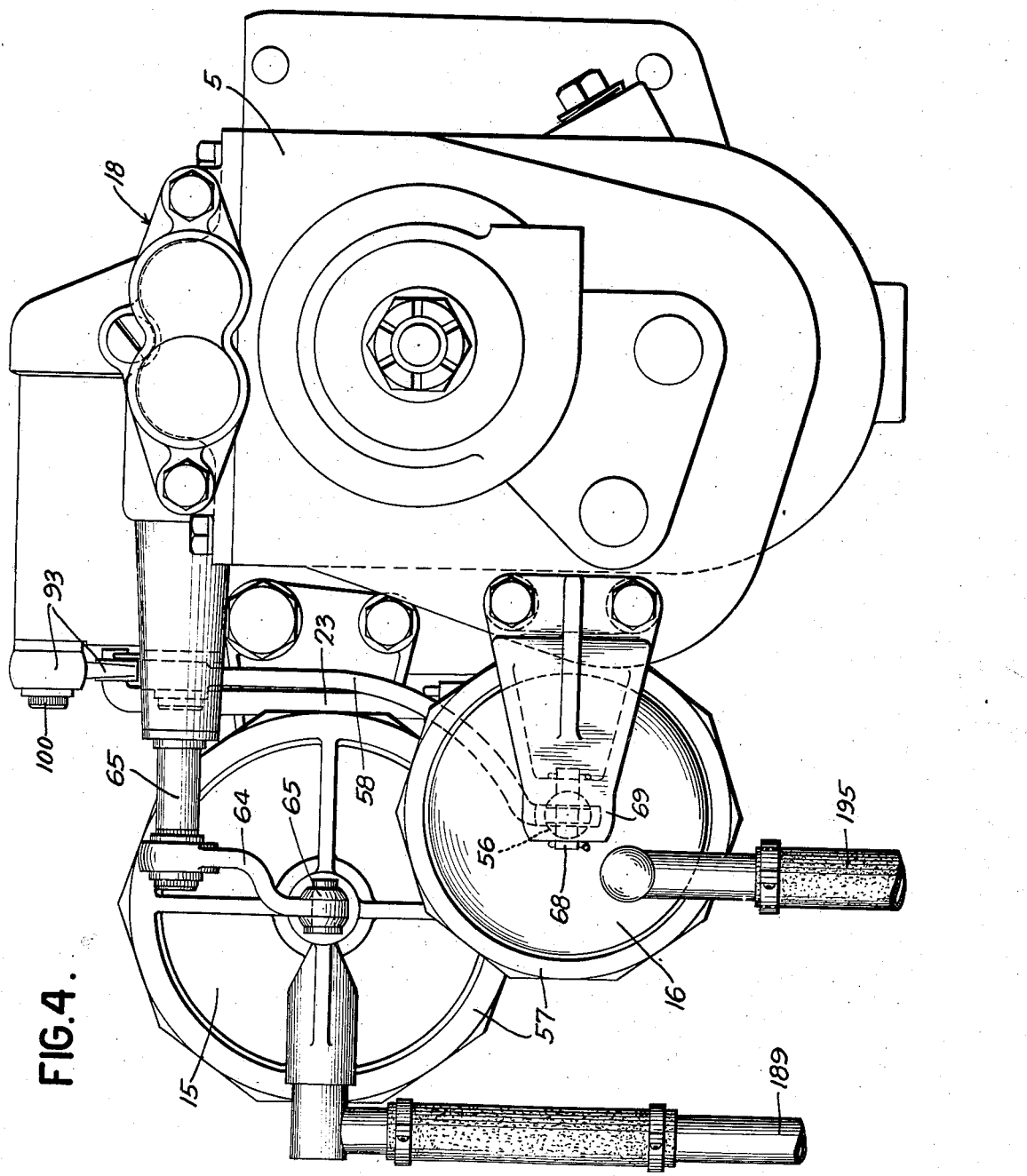

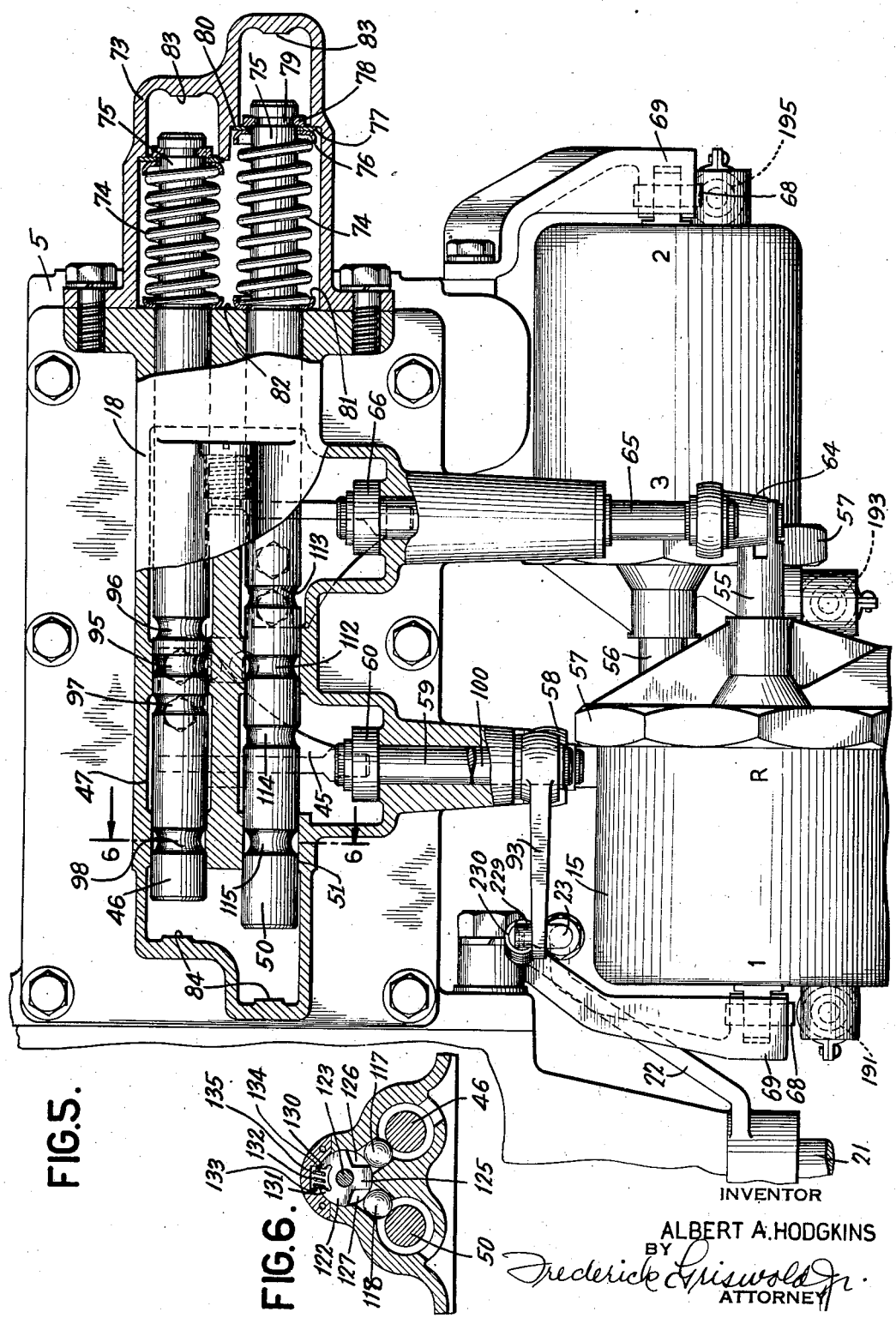

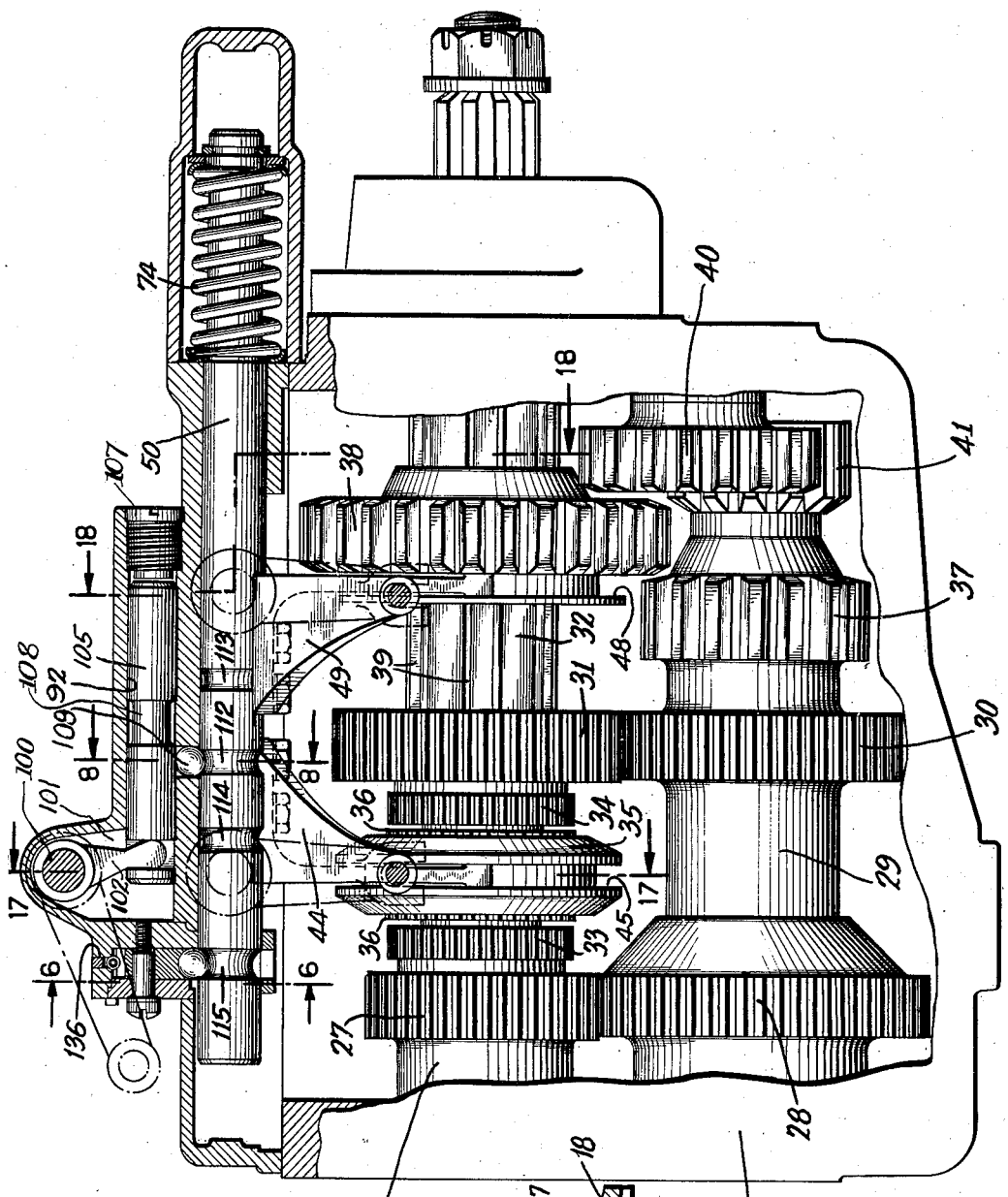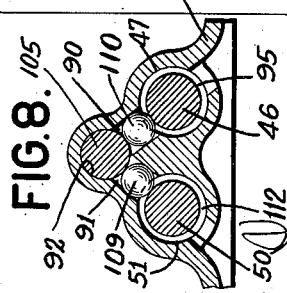

July 19, 1938.  A. A. HODGKINS  2,124,507
AUTOMATIC GEAR SHIFTING
Filed June 17, 1932  11 Sheets-Sheet 7
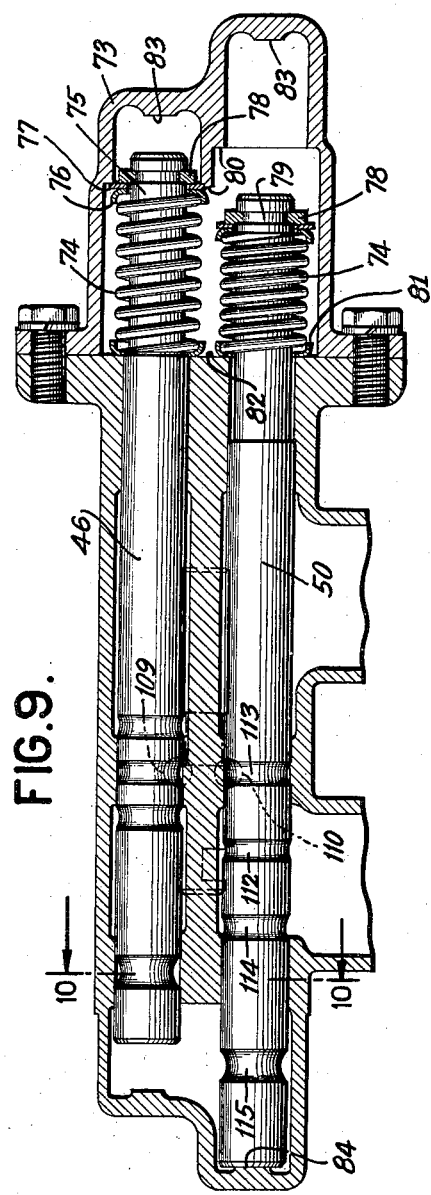
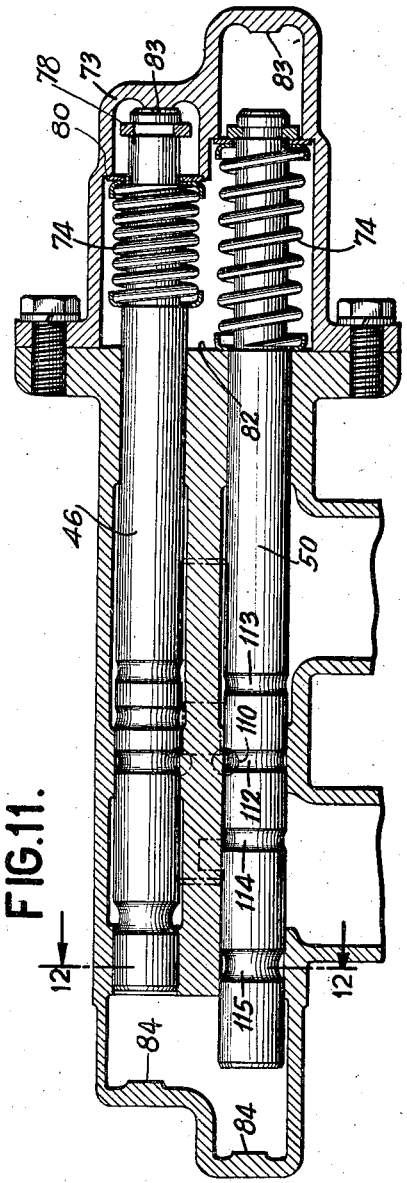
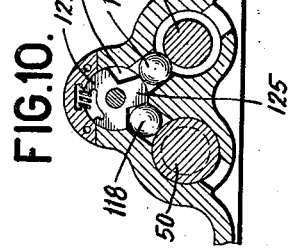
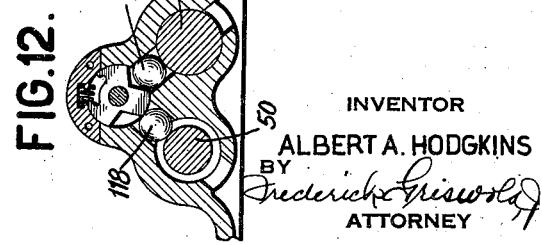
INVENTOR
ALBERT A. HODGKINS
BY
Frederick Griswold
ATTORNEY

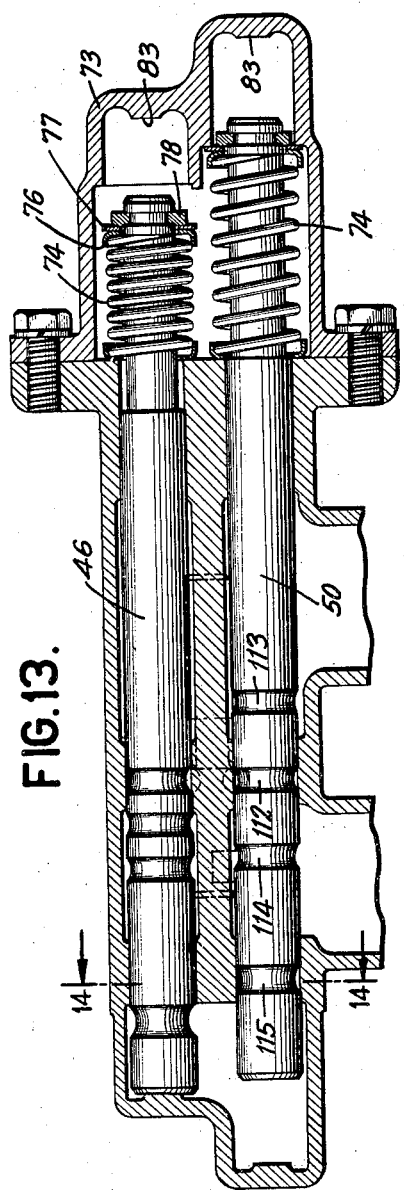
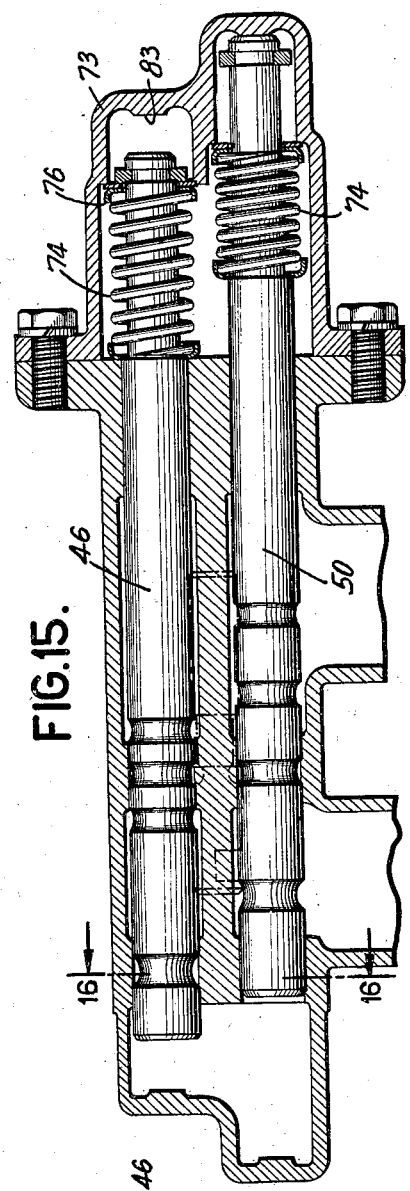
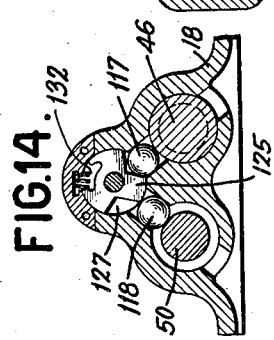
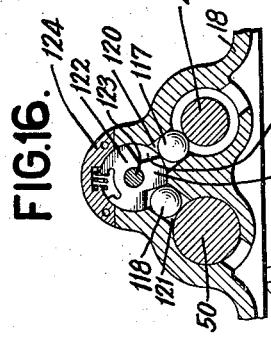

July 19, 1938.    A. A. HODGKINS    2,124,507
AUTOMATIC GEAR SHIFTING
Filed June 17, 1932    11 Sheets-Sheet 9
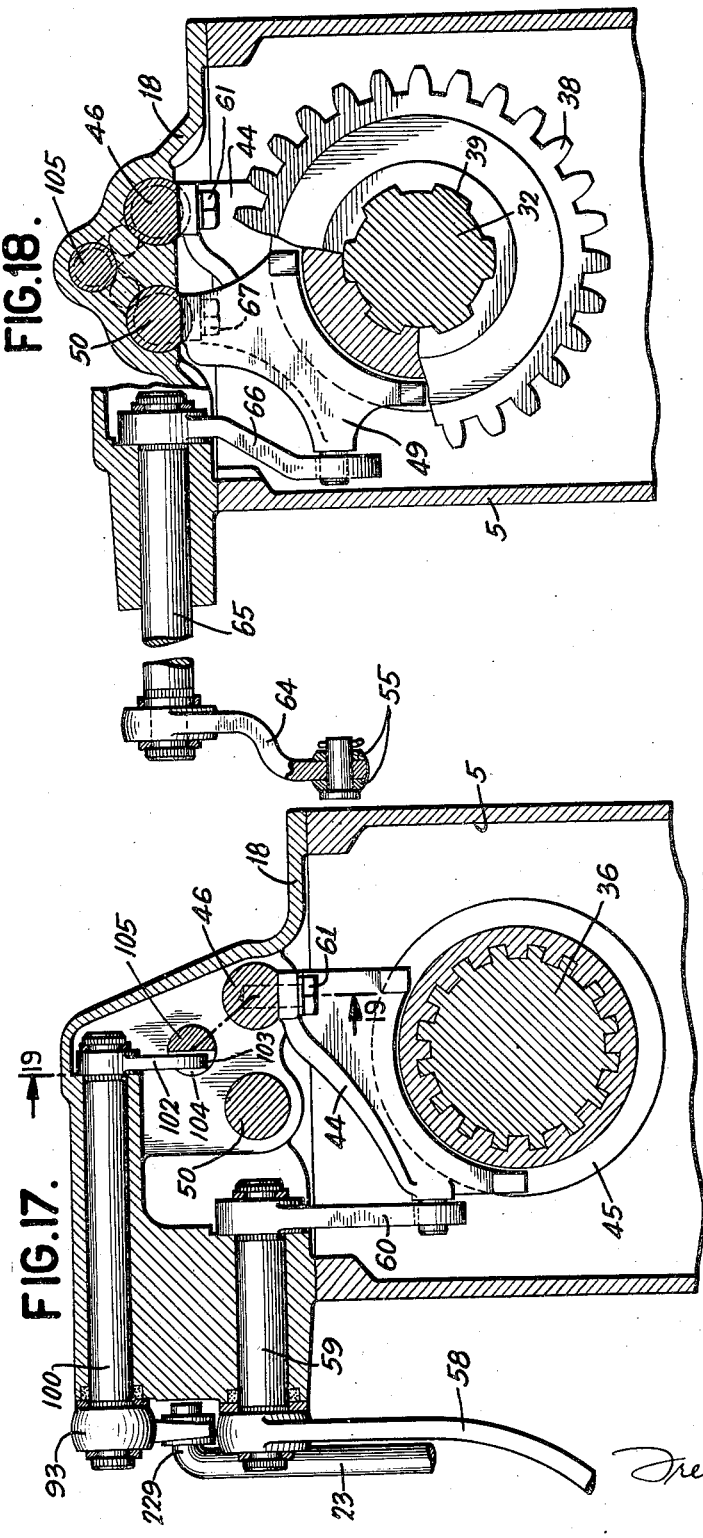
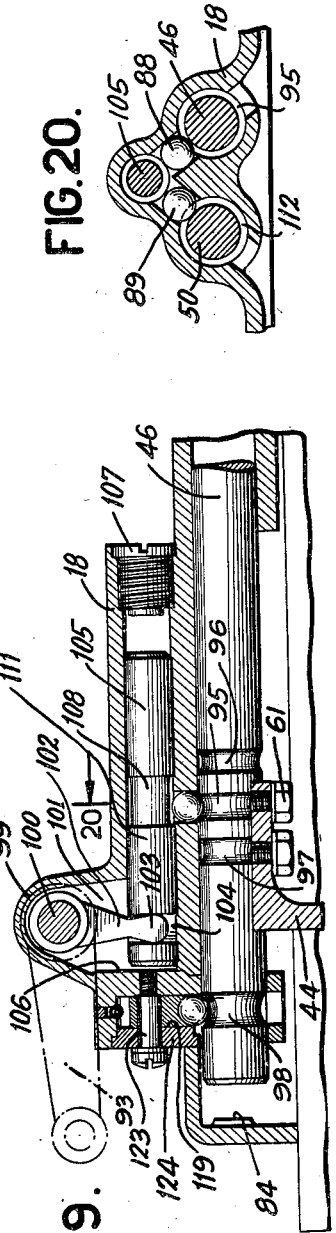
INVENTOR
ALBERT A. HODGKINS
BY Frederick Griswold Jr.
ATTORNEY

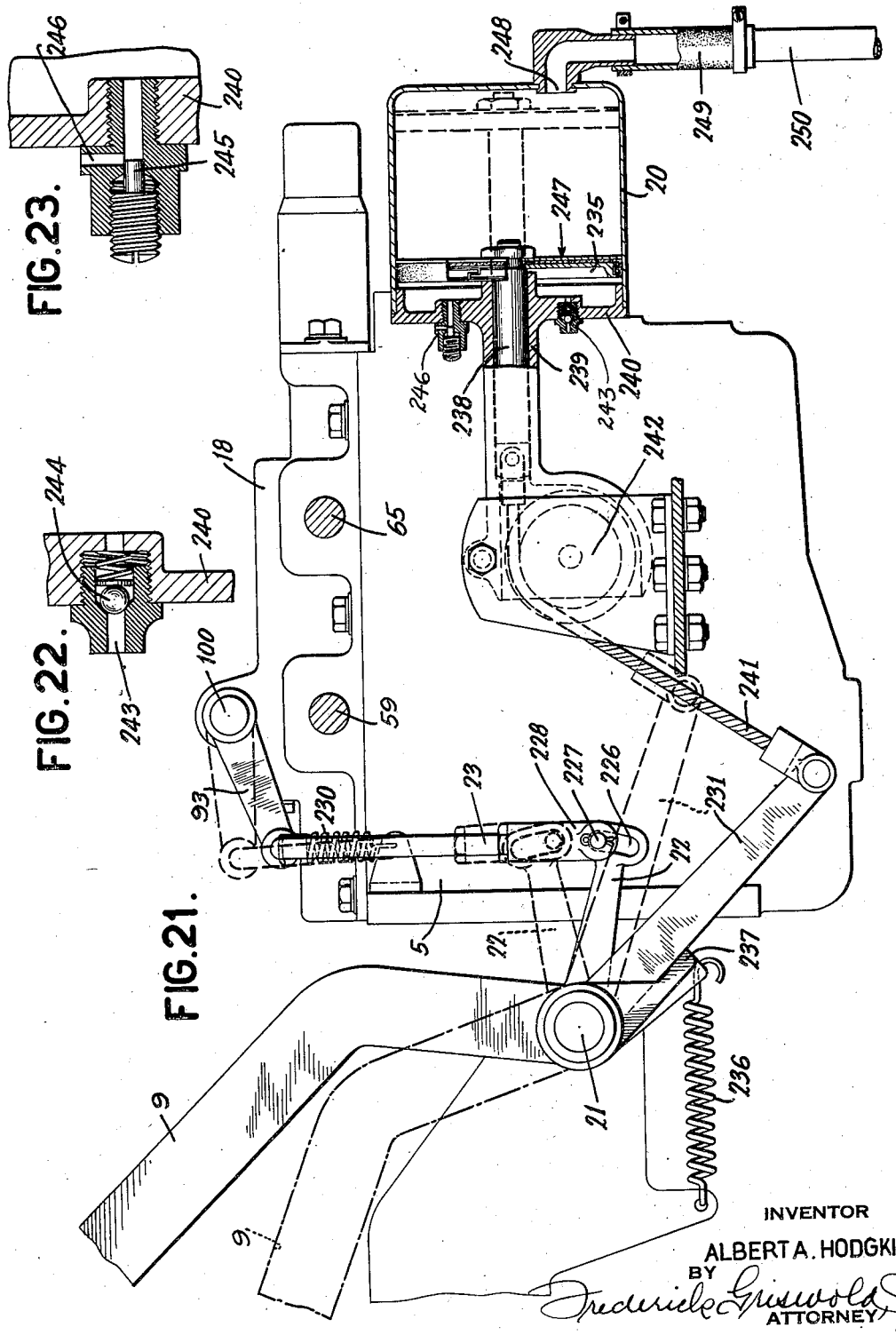

July 19, 1938.   A. A. HODGKINS   2,124,507
AUTOMATIC GEAR SHIFTING
Filed June 17, 1932   11 Sheets-Sheet 11
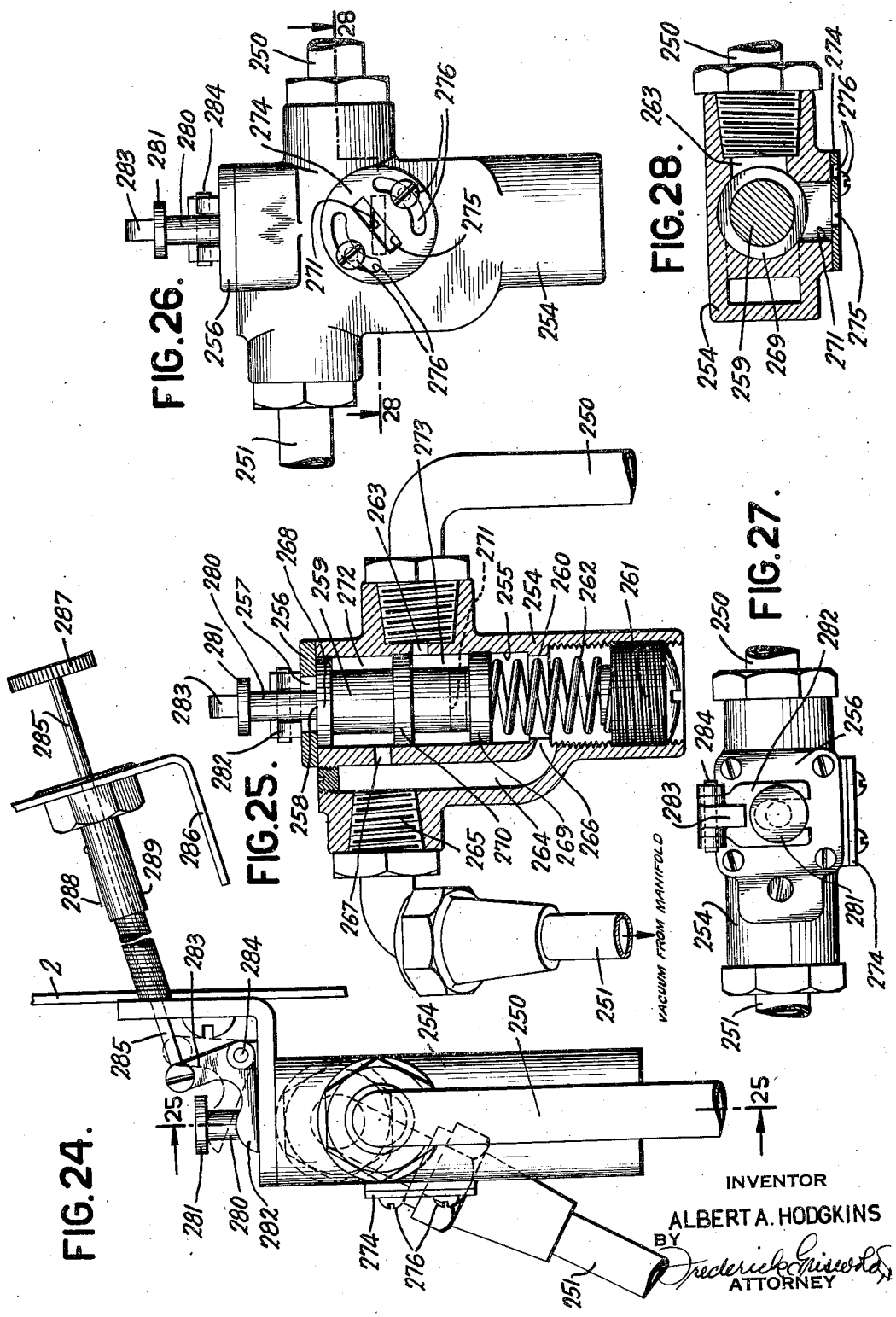
INVENTOR
ALBERT A. HODGKINS
BY
Frederick Griswold
ATTORNEY Patented July 19, 1938

2,124,507

UNITED STATES PATENT OFFICE 2,124,507

AUTOMATIC GEAR SHIFTING

Albert A. Hodgkins, Leonia, N. J., assignor to Almarc, Inc., New York, N. Y., a corporation of New York Application June 17, 1932, Serial No. 617,714

48 Claims. (Cl. 192—.01)

This invention relates broadly to the automatic performance of shifting movements, for instance, in motor vehicles and more particularly to the automatic control of the clutch and transmission gearing therefor, although not so limited.

It has heretofore been proposed to cause the engagement and release of the clutch in a self-propelled vehicle by linking the clutch actuating devices to the piston or diaphragm of a pneumatically operated motor actuated by the sub-atmospheric pressure in the intake manifold of an internal combustion engine. To control the operation of the pneumatically operated motor, a valve has been provided in the communicating passage between the intake manifold and the pneumatic motor, which valve has been actuated mechanically from the throttle of the engine. In a copending application by the present applicant, such valve controlling the said passage has been automatically operated by so devising it that it is responsive to variations in the fluid pressure. It has also been proposed, heretofore, to provide automatic gear selecting in the change speed gearing of motor vehicles and the like in which fluid pressure, usually sub-atmospheric pressure on one side of the piston or diaphragm of a pneumatic motor and atmospheric pressure on the other side is utilized to actuate the gear shifting slip rods, which sub-atmospheric fluid pressure has also been made available by a connection with the intake manifold.

One object of the present invention is to provide an automatic gear shift which is controlled by variations in the motor load.

Another object of the invention is to provide means operative by variations in pressure differential to control an automatic gear shift.

It is also an object of the present invention to provide instrumentalities whereby a motor, say, operated by fluid pressure differential can be rendered inoperative when it is not desired that the motor effect a shifting movement.

The invention also seeks pneumatically operated power means effecting the release of the drive shaft of change speed gearing from a source of power and the automatic release of the gear shifting slip rods or shifter rods whereby pneumatic or other devices may shift the gears, all in a construction in which the performance of the successive steps are automatic and dependent upon the completion of the performance of the preceding step.

It is also an object of the invention to obtain free wheeling of a self-propelled vehicle automatically whenever the momentum of the vehicle exceeds the speed of the prime mover and in which the instrumentality by which the free wheeling is obtained controls the shifting of the gears but which will not result in the accidental release of the gears or accidental alteration in the gear ratio.

Still another object of the invention is the provision of power cylinders operatively connected with the shift rods of a transmission in a compact construction wherein the power cylinders are enabled to conform to the mechanical movements necessary to effect the shifting movements.

Yet another object of the invention is the provision of power storing devices in association with the shift rods to return the shift rods to neutral position thereby assuring exact registration of the locking devices therefor.

Another object of the invention is an improved selector valve and control therefor whereby a predetermined gear ratio may be selected.

The invention also seeks to prevent, in a pneumatically operated gear shift, the inadvertent disengagement of the gears due to a sudden and unexpected fluctuation in the sub-atmospheric pressure in the intake manifold. To this end, the selector valve is provided with a check valve controlling communication between the source of fluid pressure variations and the valve.

Still another object of the invention is improvements in the construction of the power cylinders.

Another object of the invention is improvements in the control devices by which the clutch actuating devices control the movement of the shifter rods.

The invention also seeks to insure exact registration of the selector valve by the provision of indexing means thereon.

The invention also has for an object an automatic gear shifting means wherein the shifter rods and actuating devices thereof are enclosed within a leak proof transmission cover plate.

Yet another object of the invention is a transmission in which the pneumatic motors are carried on the sides of the transmission casing.

The invention also seeks an automatic shifting mechanism particularly adapted for motor vehicles which is practical from the standpoint of ease and convenience in manufacture, installation and use.

These and other objects of the invention and the means for their attainment will be more apparent from the following detailed description taken in connection with the accompanying drawings, illustrating one embodiment by which the invention may be realized and in which:—

Figure 2 is a view on an enlarged scale showing the transmission mechanism in side elevation and power cylinders, partly in section, to effect the selective engagement of the transmission gearing under the control of the clutch shifting mechanism;

Figure 3 is a view in front elevation showing the interconnecting controlling mechanism between the transmission and clutch actuating devices and looking from the left in Figure 2, and in the plane indicated substantially by the line 3—3 of Figure 2;

Figure 4 is a view showing the transmission and power cylinders in rear elevation, looking from the right in Figure 2, and taken in the plane indicated by the line 4—4;

Figure 5 is a view showing the power cylinders and transmission in plan, looking from above, parts being broken away in the interest of clearness;

Figure 6 is a detail sectional view, taken in the plane indicated by the line 6—6 of Figures 5 and 7, looking in the direction of the arrows and showing the drift lock adapted to lock the inoperative shifter rod in neutral position by the movement of a companion shifter rod to an operative position, the drift lock being shown in inoperative position in this view;

Figure 7 is a view, in longitudinal section, showing the transmission gearing and shifter rods in neutral position, the shifter rods being locked against movement by the clutch controlled locking devices;

Figure 8 is a detail view, in transverse section, taken on the plane indicated by the line 8—8 in Figure 7 and looking in the direction of the arrows;

Figure 9 is a fragmentary view in plan, showing the shifter rods in the position occupied when the low speed gearing is in mesh;

Figure 10 is a detail view, in transverse section, showing the position of the drift lock when the low speed gearing of the transmission is in mesh and with the shifter rod in neutral position locked against movement, the view being taken in the plane indicated by the line 10—10 of Figure 9, looking in the direction of the arrows;

Figure 11 is a view similar to Figure 9 but showing the position of the shifter rods when the intermediate gearing of the transmission is engaged;

Figure 12 is a detail view in transverse section, showing the manner in which the shifter rod in neutral position is locked by the drift lock in the position of the shifter rods shown in Figure 11 and taken in the plane indicated by the line 12—12 of Figure 11;

Figure 13 is a view similar to Figures 9 and 11, but showing the position of the shifter rods when the high speed gearing of the transmission is in mesh;

Figure 14 is a transverse sectional view showing the shifter rods, in the position of Figure 13, with the shifter rod in neutral position, locked by the drift lock and taken on the line 14—14 of Fig. 13;

Figure 15 is a view showing the position of the shifter rods when the reverse gearing of the transmission is in mesh;

Figure 16 is a transverse sectional view taken in the plane indicated by the line 16—16 of Figure 15, looking in the direction of the arrows and showing the position of the drift lock with respect to the shifter rods, in the position shown in Figure 15;

Figure 17 is a transverse sectional view showing the shifter rods and gear shifting fork and the actuating device therefor, for the intermediate and high speed ratio gearing, taken in the plane indicated by the line 17—17 of Figure 7, looking in the direction of the arrows;

Figure 18 is a transverse sectional view taken in the plane indicated by the broken line 18—18 of Figure 7, showing the shifter rods, gear shifting fork and actuating mechanism therefor for the reverse and low speed ratio gearing;

Figure 19 is a detail view of the shifter rods, clutch control lock therefor and drift lock in the position in which the clutch controlled lock has released the shifter rods for movement by the power cylinders, and taken in the plane indicated by the line 19—19 of Figure 17, looking in the direction of the arrows;

Figure 20 is a transverse sectional view taken in the plane indicated by the line 20 of Figure 19, looking in the direction of the arrows, and showing the shifter rods released by the clutch controlled lock for movement;

Figure 21 is a view in side elevation showing the transmission and automatic clutch operating mechanism, the gear shifting pneumatic motors or power cylinders being removed in the interest of clearness;

Figure 22 is a detail view in section, on an enlarged scale, showing the check valve for admitting atmospheric pressure to the clutch operating power cylinder;

Figure 23 is an enlarged detail view showing, in section, the adjustable bleed port for the clutch operating power cylinder;

Figure 24 is a fragmentary view showing, in outside elevation, the automatic valve which controls communication between the intake manifold and the clutch operating pneumatic motor or power cylinder together with the manual devices for locking said valve in inoperative position;

Figure 25 is a view in longitudinal section, taken in the plane indicated by the line 25—25 of Figure 24, looking in the direction of the arrows and showing the controlling valve in clutch engaged position;

Figure 26 is a view in side elevation of the valve illustrated in Figure 24 and showing particularly the adjustable bleed port for admitting air at atmospheric pressure to the clutch operating power cylinders;

Figure 27 is a plan view of the valve of Figure 24 looking from above;

Figure 28 is a transverse sectional view of the valve of Figures 24 through 27, taken in the planes indicated by the broken line 28—28 of Figure 26, looking in the direction of the arrows.

Figure 1:
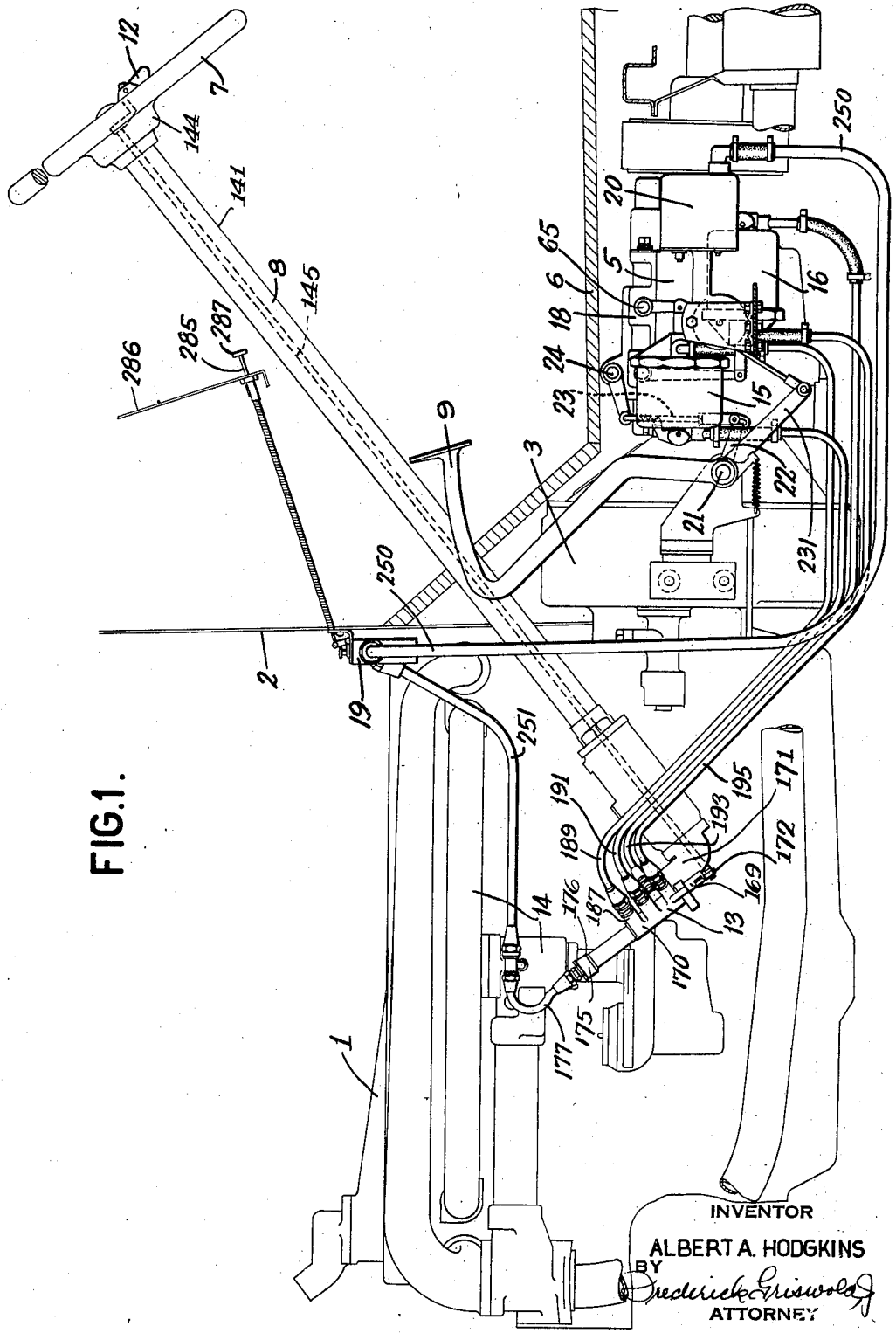
Figure 1 is a view showing the front end of a motor vehicle with an internal combustion engine, change speed gearing and clutch to which the invention is applied.

In Figure 1, there is illustrated somewhat diagrammatically the forward end of a motor vehicle in which an internal combustion engine is indicated at 1 in front of the dash 2 driving through a clutch of some convenient kind within the housing 3, a drive shaft 4 (Figure 7) entering the transmission housing 5 disposed, as is usual, beneath the floor 6 of the vehicle. The vehicle is guided, as is usual, by the steering wheel 7 (Figure 1) mounted on the steering column passing through the floor 6 and dash 2 to a point beside the engine. A clutch pedal 9 protrudes through the floor of the vehicle, as is usual.

The structural details of the illustrated embodiment cannot conveniently be described in the order in which the various component elements automatically take part in the performance of the shifting movements. The operation of this device will, therefore, first be briefly described in the order of operations: Assuming the engine 1 running, the transmission gearing 5 out of mesh and the clutch 3 disengaged, the driver of the vehicle will select the desired gear ratio, say, low gear, by manually moving the selector handle 12 to position opening communication by selector valve 13 from the intake manifold 14 of the engine 1 to one of the pneumatic motors or power cylinders 15 or 16, say the motor 15, the piston of which is connected to a rock shaft 65 journalled in the cover plate 18 of the transmission case, adapted to perform the shifting movement into low gear. As soon as the vacuum builds up to the desired degree in the intake manifold 14, a clutch controlling valve 19 conveniently carried on the front of the dash 2 and responsive to such degree of suction, opens communication between the intake manifold 14 and a pneumatic motor or power cylinder 20, the piston of which is connected with the clutch actuating shaft 21 to effect the clutch release. Just prior to the release of the clutch, and as a concomitant of the actuation of the instrumentalities effecting the release of the clutch, gear shifting shifter or slip rods are unlocked or released by a connection 22, 23 between the clutch actuating shaft 21 and a shifter rod locking bar rock shaft 24 for movement thereby permitting the gear to be brought into mesh.

In the illustrated embodiment, the transmission affords three speeds forward and reverse. The rearwardly disposed pneumatic motor or power cylinder 16 effects actuation of the gear shifting devices for intermediate and high gear and the forwardly disposed pneumatic motor 15 effects actuation of the gear shifting devices for reverse and low gear.

While the invention is not concerned with the type of change speed gearing adopted, there is shown for purposes of illustration in Figure 7, a type of transmission in which the gearing for high and intermediate speeds is constantly in mesh. Thus the drive shaft 4 entering the transmission case 5 has fixed thereon a pinion 27 constantly in mesh with the gear 28 fixed on the countershaft 29. Also on the countershaft 29 is fixed a gear 30 constantly in mesh with a gear 31 freely rotatable on the driven shaft 32. The gears 27 and 31 are formed with or otherwise provided with dental clutch members 33 and 34, respectively, as is usual, adapted to cooperate, respectively, with the internal dental clutch member of a sleeve 35 slidable on a gear 36 corresponding to the dental clutch members and fixed on the driven shaft 32. Thus when the sleeve 35 is moved to the left, as viewed in Figure 7, the sleeve 35 and clutch member 33 connect the driven shaft 32 directly to the drive shaft 4 for direct drive at high speed.

When the sleeve 35 is moved to the right, the intermediate speed clutch member 34 is brought into connection with the gear 36 by the sleeve 35, the drive being then effected through the meshing gears 27 and 28 and the meshing gears 30 and 31 for drive in intermediate speed. Also on the countershaft 29 is fixed a pinion 37, which is adapted to be engaged by a gear 38 slidably mounted by the splines 39 on the driven shaft 32, and when the pinion 37 and gear 38 are in mesh, the drive is effected from drive shaft 4 through the meshing gears 27 and 28 and 37 and 38 for low speed. To effect drive in reverse, the gear 38 is shifted into engagement with an idler gear 40, constantly in mesh with a countershaft pinion 41 also on the countershaft 29.

Referring again to Figure 2, it will be noted that there is disposed on the side of the transmission casing 5 two cylinders 15 and 16, with respective pistons 52 and 53, each of which normally occupies a position intermediate the ends of the cylinder. Each piston, 52 and 53, is mounted upon the reduced end of a piston rod, 55 and 56, journalled for sliding movement in a removable head 57 for the cylinder and is connected at its outer extremity with the appropriate shifter rod and gear shifting fork in the following manner: The piston rod 56 of cylinder 16 is connected to the extremity of an arm 58 fixed on the end of a rock shaft 59, journalled in the removable cover plate 18 for the transmission casing 5. On the inner extremity of the rock shaft 59 (Figure 17) is fixed a downwardly depending arm 60 connected with provision for relative movement in any convenient fashion with a shifter fork 44 conveniently removably secured, as by the fork screws 61 to the shifter rod 46 so that movement of the piston 53 toward the left, as viewed in Figure 2, will rock the arm 60 in a clockwise direction to cause the dental clutch 35, 33 to engage for direct drive in high speed, while movement of the piston 53 to the right, as viewed in Figure 2, will rock the arm 60 in a counter-clockwise direction to thereby shift the dental clutch 35, 34 into engagement for drive through the intermediate gear ratio.

The high and intermediate speed sleeve 35 is reciprocated by a shifter fork 44, the arms of which are engaged in a collar 45 in the sleeve 35. Fork 44 is secured to a shifter rod 46 (Figure 5) slidable in a chamber or bearing 47 in the cover plate 18 for the transmission housing 5. The low and reverse gear 38 is provided with a collar 48 which is engaged by the arms of a shifter fork 49 secured to a companion low speed and reverse shifter rod 50, also mounted in a chamber or bearing 51 in the cover plate 18. The shifter rod forks 44 and 49 and shifter rods 46 and 50 are actuated by pneumatic motors 15 and 16, the movable walls or pistons of which are movable by pressure differential.

Similarly, the piston rod 55 of low speed and reverse cylinder 15 extends rearwardly through a suitable bearing in the head for pivotal connection with the end of an arm 64 fixed on the end of a rock shaft 65, also journalled in a bearing in the cover plate 18 of the transmission casing 5. On the inner end of the rock shaft 65 is fixed a downwardly depending arm 66 suitably secured, as by a connection permitting relative movement therebetween, with a fork 49 secured as by screws 67 to the shifter rod 50, and adapted to shift the gears for drive in low speed and drive in reverse. Thus when the piston 52 is moved to the left, as viewed in Figure 2, the arm 64 and rock shaft 65 and operating arm 66 are moved in a clockwise direction to slide the gear 38 into mesh with the gear 37 to provide the low gear ratio and when the piston 52 is moved to the right, as viewed in that figure, the arms 64 and 66 on the rock shaft 65 are moved in a counter-clockwise direction to cause engagement of the gear 38 with the reverse gear pinion 40.

To accommodate the cylinders 15 and 16 and sliding movements of the piston rods 55 and 56 to the variations in position of the end of the arms 58 and 64, the cylinders 15 and 16 are pivoted in any convenient fashion, shown as by the pivot pins 68 passing through corresponding ears and lug 69 connecting each cylinder end remote from the end in which the piston rod is journalled to some convenient part of the transmission housing 5, preferably in the axis of the cylinders.

Shifter rod neutralizing device

The chambers 47 and 51 (Figure 7) for the shifter rods 46 and 50 are open at their rearward ends and a housing 73 or end closure is carried on the rear end of the cover plate within which the ends of the shifter rods reciprocate. The shifter rods are each provided with a power storing device 74 shown in the form of coil springs encircling the protruding ends 75 of the respective shifter rods, which ends 75 may, if desired, be of reduced diameter. These power storing devices 74 serve to return the shifter rods to neutral position when released from a position to which they have been moved in the selection of a gear ratio. By disposing the returning springs directly on the shifter rods as distinguished from associating them with the power cylinder, an exact registering of the rods is attained and there is avoided the inexact registration of the shifter rods resulting from the play in the several connections of the arms and rock shafts where the neutralizing springs are associated with the power pistons. As shown, the reduced end of each shifter rod is provided with a spring seat 76 freely slidable thereon and a stop 77 which takes the form of an annulus also shown as slidable on this end of the rod and the annular stop 77 is held on the end 75 of the rod by a collar 78 fixed as in a groove 79 therein. The annular stop 77 is adapted to engage a shoulder 80 formed in the spring housing and the spring seat 76 is freely slidable on the reduced end 75 of the shifter rod but is engaged in the neutral position by a limiting stop formed on the bearing. The other end of this spring 74 is engaged by a seat 81 also sliding on the reduced rod end 75 and preferably fixed against displacement in one direction by contacting with the portion of increased diameter of the shifter rod operating in the shifter rod chamber. The end wall of the shifter rod chamber serves as an abutment 82 or limiting stop for the spring seat 81. In its outer extremity, the chamber 73 for the power storing device 74 is provided with a stop 83 against which the end 75 of the shifter rod may abut in one extreme position of its movement. At the front end of the shifter rod bearing, it is provided with a limiting stop 84.

Thus when a shifter rod 46 or 50 is moved to the right as viewed in Figures 5 and 7, its end abuts against the end or abutment 83 in the end of the spring housing 73. At the same time, the annular stop 77 and/or spring seat 76 is in engagement with the spring limit stop 80 and as the rod carries with it, in its movement to the right, the spring seat 81, the spring 74 is compressed, thus storing up power or energy which, when the shifter rod is released, will enable the spring 74 to return the shifter rod to neutral position when the seat 81 on the shifter rod is in abutting relation with the abutment 82 on the cover plate and the spring 74 is expanded. Similarly, where the shifter rod is moved to the left, its left end abuts against the forward end or stop 84 therein of the cover plate and the spring seat 76 is carried away from the limit stop, again compressing the spring 74 and storing up energy to return the shifter rod to neutral position when it is released for movement.

Shifter rod lock

To fix the shifter rods in their several operative positions, a lock is provided which, in the present instance, takes the form of balls 109 and 110 or analogous rolling or reciprocating or movable locking members which are held for movement of reciprocation in recesses or ways 90 and 91, respectively, opening into the respective shifter rod chambers 47 and 51 and a locking bar chamber 92 (Figures 7, 8 and 19).

Where the transmission is adapted to three speeds forward and reverse, two shifter rods 46 and 50 are provided and each shifter rod is formed with four recesses or peripheral grooves. Shifter rod 46 adapted to be coupled with the gear shifting devices for second and high speed gear ratio is provided with a recess 95 by which, as after explained, the shifter rod 46 is locked in neutral position and a recess 96 whereby the shifter rod is locked in high speed position and a recess 97 by which it is locked in intermediate position. The shifter rod is also provided with a recess 98 by which it is locked by a drift lock in neutral position by the movement of the companion shifter rod 50 away from neutral position.

It is desirable that the shifter rods 46 and 50 be locked against movement and hence the gear shifting devices be locked against a change in gear ratio or a movement not contemplated or intended. This is accomplished by preventing the movement of the shifter rods except when the clutch is disengaged.

As shown, the cover plate 18 of the transmission 5 is formed with a locking bar chamber 92 in a plane above the plane of the shifter rod chambers 47 and 51. This chamber 92 is also shown as substantially cylindrical for convenience in manufacture and its axis is preferably in a perpendicular plane midway between the axis of the shifter rods 46 and 50.

At its forward end, the upper portion of the cover plate is formed with a bearing 99 for a rock shaft 100, having an arm 93 thereon which is clutch actuated through the connections 22, 23 (Figure 1). Within a recess or extension 101 (Figure 7) of the locking bar chamber, an arm 102 fixed on the rock shaft 100 rotates in a direction parallel to the axis thereof. The lower end of the arm 102 is conveniently formed with a rounded end 103 disposed in a groove 104 in the end of the locking bar 105. Thus as the rock shaft 100 is turned, the locking bar 105 is moved from one extreme position in which, say, the forward end abuts against the front end 106 of the locking bar chamber 101 as a stop and in its other extreme position abuts against an adjustable stop shown as a screw threaded plug 107.

Intermediate the ends, the locking bar 105 is formed with a recess, shown as a peripheral groove 108 conveniently with rounded sides, adapted in one position of movement of the locking bar (Figure 19) to register with the passages or ways 90 and 91 to receive a portion of the locking members or balls 109 and 110 protruding therein. In another position of the locking bar 105 (Figure 7) the recess 108 is out of register with the ways 90 and 91, and one portion, say, 111, of the locking bar 105, of greater diameter covers the ways 90 and 91 and holds the balls 109 and 110 downwardly into one of the recesses 95, 96 and 97 or the corresponding recesses in the shifter rod 50. The companion shifter rod 50 is similarly formed with recesses in number corresponding to those of the shifter rod 46, a recess 112 being the neutral recess, a recess 113 being the recess for locking in low gear position, a recess 114 for reverse drive position and a recess 115 for locking by the drift lock when this shifter rod 50 is in neutral position.

Shifter rod operation

Referring now to Figure 5, the shifter rods 46 and 50 are shown in neutral position with the restoring springs 74 normally extended although sufficiently compressed, and the spring seat stops 78 and 81 abutting the limit stops 80 and 82, respectively, of the spring chambers, because of the inherent resiliency and degree of compression of the springs, as shown. In this position, the grooves 95 and 112 are in register with the ways 90 and 91, respectively (Figure 8). It may be assumed, further, that the locking bar 105 occupies the position shown in Figure 7, held through spring 236, wherein the detents 109 and 110 are held in the grooves 95 and 112 by the enlarged or locking portion 111 of the locking bar 105. In this position of the locking bar, the clutch is engaged. Assuming now that it is desired to shift the gears from neutral to low or first speed, the clutch being disengaged. This causes the movement of the locking bar 105 until the peripheral groove 108 is in register with the ways 90 and 91, as in Figure 19. Thus the groove 108 is so positioned as to receive the balls or detents 109 and 110 when the power cylinder or motor 15 moves the shifter rod 50 forwardly to the position shown in Figure 9, thereby compressing the restoring spring 74 thereon and bringing the groove 113 in register with the way 91. Then when the clutch is reengaged and the locking bar 105 shifted to the rear by spring 230, the detents 109 and 110 are cammed downwardly by the curved side of the groove 108 into the neutral recess 95 of the bar 46 and into the low speed recess 113 of the shifter rod 50, thereby locking both these shifter rods in position and locking the gears in the low gear ratio.

To shift from low gear to intermediate gear, the clutch is again released to thereby again bring the recess 108 in the locking bar 105 in register with the ways 90 and 91, thereby releasing the detents 109 and 110 for movement, thereby permitting the return spring 74 to return the shifter rod 50 to neutral position shown in Figure 11. The shifter rod 46 is then moved to the position shown in Figure 11 by the piston of the power cylinder 16 to bring the recess 97 in register with the way 90, whereafter the clutch is again reengaged, again moving the locking bar to the position shown in Figure 7, and again camming the detents 109 and 110 into the respective grooves 97 and 112 and locking the shifter rods in that position. As observed in Figure 11, the return spring 74 on rod 46 is thus compressed against the limit stop 80 in the return spring housing 73, thereby storing energy for effecting the return of the shifter rod 46 to neutral position when again unlocked by the clutch controlled locking bar 105 and when permitted by movement of the appropriate cylinder 16. To change the gear ratio from intermediate to high speed, the locking bar 105 is again moved to release the detents 109, 110 and the piston of cylinder 16 moving to the left again shifts the shifter rod 46 in the opposite direction (i. e., to the left) to bring the recess 96 in register with the way 90 and to the position shown in Figure 13, where the shifter rods are again locked by the clutch controlled locking detents 109, 110 by movement of the locking bar 105. The reverse position for the shifter rods is shown in Figure 15 where the shifter rod 46 is in neutral position and the shifter rod 50 has been moved rearwardly until the locking recess 114 is in register with the way 91 and the locking detents 109, 110 have been cammed into locking engagement with the said recess 114 and the recess 95.

Drift lock

It is desirable that further control of the shifter rods 46 and 50 be had in order that, while any one of the shifter rods may be freely moved when all are in a given or neutral position, nevertheless when one has been moved from that position, it will be impossible to move the others until the first has been returned to its original position. This is effected, generally, in the illustrated embodiment by the provision of recesses 98 and 115 formed in the respective ends of the shifter rods 46 and 50 within each of which is adapted to lie the lower zone of a ball 117, 118 (Figure 10), which serve as detents to selectively hold the shifter rods releasably in neutral position.

Disposed in the cover plate 18 of the transmission housing 5, forwardly of the locking bar recess 101, is a forwardly facing recess 119 of substantially cylindrical form as shown, for instance, in Figures 7, 19 and 10, from which recess a passage 120 leads to the shifter rod chamber 47 and another passage 121 leads to the shifter rod chamber 51. Thus when either of the shifter rods are shifted, one of the balls is cammed out of the groove and may move upwardly and inwardly so as to project a substantial distance within the drift lock recess 119.

In order, however, that one of the rods will be prevented from being moved until the adjacent rod is in neutral position, it is necessary to provide means to hold the corresponding ball within the groove in one rod when the other is shifted. To accomplish this, there is mounted in the drift lock chamber 119 a drift lock rocker 122 of substantially cylindrical or disc-like shape pivotally mounted for rotation, say, on a pivot pin 123 passing through the cover plate 124 for the recess 119 and threaded into the rear wall 106 thereof. Obviously the pin or other pivots may be omitted as the rocker 122, fitting in the recess 119, will turn on its axis and function. The pin 123, however, serves as securing means for the cover 124 as well. Below the pivot 123 or axis, the rocker 122 may be provided with a depending lug 125 formed conveniently by cutting sector shaped pieces out of the rocker to form recesses 126, 127 therein. The lug 125 or finger may, if desired, stand in a neutral position as shown in Figure 6, substantially out of engagement with both of the balls 117 and 118, but when the rocker 122 is swung about its pivot, its lower end will engage one of the balls, as shown in Figures 10, 12, 14 and 16, and prevent this ball moving out of the corresponding recess in the shift rod so as to positively hold that rod against movement.

As shown in the drawings, the segmental recesses 126, 127 are of a size sufficient to receive the respective balls 117, 118 thereby permitting the upper zone of one of the balls to move in the raceway 120, 121 out of the shifter rod chamber 47 or 51 to permit movement of the shifter rod therein. When, say, the ball 117 (Figure 14) is thus free to move out of the shifter rod chamber 47, the ball 118 may drop down in the raceway 121 and in locking groove 115 in the shifter rod 50. These grooves 98, 115 are curvilinear in cross section to facilitate the entrance into and urge the balls out of the grooves and the relative disposition and size of the rocker 122, the balls 117, 118 and the associated parts is such that when the one shifter rod, say, 50, is moved, the ball 118 will be moved outwardly in the raceway 121 to engage the side of the lug 125 and swing the rocker 122 about its pivot or axis so as to move the lug 125 to a position wherein its end engages the other ball 117 (Figure 16) so as to hold the latter in the raceway 120 and in the groove 98 and positively prevent any movement of the shifter rod 46. Thus, if the shifter rod 46 is at this time subjected to pressure, tending to move it longitudinally, this will tend to cam the ball 117 from the recess 98 in the shifter rod. This tendency will be resisted by the rocker 122 and the pressure upon the ball 117 will eventually be transmitted to the rocker 122 to be borne entirely by the pivot 123 or chamber wall, as the case may be, so that no force will be acting to urge the other ball 118 toward the shifter rod 50 and thereby bind this rod so as to oppose its movement.

The rocker 122 is cut out in its upper portion or otherwise formed with bifurcated arms 130 and 131 shown more particularly in Figure 6. A compression spring 132 is mounted between fingers 133 and 134 formed on a flat segment 135 inserted in a slot 136 in the top wall 137 of recess 119. It will be observed that the ends of the bifurcated arms 130 and 131 of the rocker 122 will straddle the fingers 133 and 134 and upon the respective sides of these fingers will engage the ends of the spring 132 so as to compress this spring when the rocker is moved to one side or the other by a ball moved thereagainst, as shown for example in Figure 10. When the rod 46, for example, has been returned to neutral position and the ball 117 is again seated in the depression 47, the spring 132 will insure the return of the rocker 122 to its inoperative position, as shown in Figure 6. It will be apparent that the spring 132 is free to be compressed from either end, so that the one spring will effect the return of the rocker arm 125 to its central position regardless of the direction in which it is moved.

Referring now to Figures 5, 6 and 9 through 16 and assuming that the shifter rods 46 and 50 are in the neutral position indicated in Figures 5 and 6, it will be observed that the respective returning springs 74 are in extended position with the abutments 77 in engagement with the shoulders 80 and the seats 81 at the other end of the springs 74 in engagement with the corresponding shoulders 82 formed on the walls of the shifter rod guide passages. It will be observed that the bolt controlled locking balls 109, 110 are depressed by means of the bolt 105 into the neutral grooves 95 and 112. When now the proper end of the proper power cylinder, say, 15, is in communication with a source of reduced air pressure, the pressure of atmospheric air on the opposite side of the piston 52 will tend to move the crank 64 and thereby rock the shaft 65 to move the fork 49 and with it the shifter rod 50 forwardly to the position shown in Figure 9 providing, of course, that the groove 108 of the clutch controlled locking bolt 105 (Figure 19) is in register with the raceway 90 to permit the ball 110 to move upwardly into the groove. This also compresses the return spring 74 from the forward end thereof so that the return spring 74 will tend to return the shifter rod 50 to initial position intermediate the ends of the passage. As the shifter rod moves forwardly, the clutch controlled locking ball 110 will be cammed out of the groove 112 to permit the movement of the rod. Furthermore, as the rod moves forward the drift lock ball 118 will be cammed out of the depression 115 and engaging against the lug 125, will swing the rocker 122 from the position shown in Figure 6 to the position shown in Figure 10, wherein the end of the lug 125 engages the other ball 117 and locks the rod 46 against movement.

If now the shift is to be made to intermediate gear, the operator must move the rod 46 and the rod 50 must be returned to neutral position. This, however, does not require any care on the part of the operator; he merely actuates the selector 12 to open the valve 13 to the proper cylinder 16 to reduce the air pressure therein on the rear face of the piston 53. At this time, the other end of this cylinder 16 and both ends of the other cylinder 15 will be vented to the atmosphere and the spring 74 will tend to move the rod 50 back to neutral position, as shown in Figure 11. Likewise, the reduced pressure existing in the rear end of the cylinder 16 operating the rod 46 will cause its force to move the rod 46 rearwardly to the position shown in Figure 11, where the ball 109 falls into the groove 97 while the other ball 110 moves into the neutral groove 112 of rod 50 and the reengagement of the clutch effects the movement of the bolt 105 to locking position to hold the balls 109, 110 in the respective grooves 97 and 112 in the shifter rods. This movement has resulted in the locking of the ball 118 in the groove 115 of shifter rod 50 by the drift lock lug 125 as shown in Figure 12, thus locking rod 50 against movement. Therefore at this time pressure has been exerted upon both of the shifter rods tending to move rod 50 to its neutral position and the other to its locking position. Both of the rods will be locked against movement due to the locking bolt 105. However, when this bolt is moved forwardly both rods will be released as far as this part of the structure is concerned. It is at this time that the rod controlling mechanism or drift lock 122, 117, 118 is particularly advantageous.

It will be understood that at this time both shifter rods are free to move except for this controlling mechanism but, as shown in Figure 12, the rod 50 will be held against movement by the lug 125 of the rocker 122 which engages the ball 118 and holds it in the depression 115. The rod 46 is, however, free to move and will be moved by the return spring 74 back to neutral position. In this position, the drift lock ball 117 will drop into the groove 98 and permit the drift lock compression spring 132 to move the rocker 122 from the position shown in Figure 12 to the neutral position shown in Figure 6 and wherein the ball 109 will be released and the shift rod 46 will be moved by the piston 16 in the proper direction. Figures 10, 12, 14 and 16 show the various positions assumed by the drift lock in locking the inoperative shifter rod (i. e., that one in neutral position) at the different gear shifting positions.

It will, therefore, be apparent that one of the shifter rods will be retained against movement from neutral position until the other has been returned to neutral position, and it will also be observed that the rod 46, say, will be retained in its neutral position without the action of any force which tends to oppose the return movement of the other rod, say, 50, or bind this rod against movement, although at the same time the locking of one of the rods is controlled by the other in that the one is released when the other is returned to a neutral position.

Gear selecting

Briefly, in the illustrated embodiment, a selector valve 13 is provided controlling communication between the intake manifold 14 and the cylinders 15, 16 on the respective sides of the pistons 52 and 53 and this selector valve 13 is preferably controlled from a point convenient to the operator of the vehicle, say, on the top of the steering column 8.

The steering column of a motor vehicle is indicated at 141 and the steering post has fixed thereon a steering wheel 7, the hub of which is indicated at 144. The space within the steering column may be occupied by adjusting tubes for the spark and/or gas, not shown. Centrally thereof, is shown the selector shaft 145 by which the valve 13 controlling the communication between the pneumatic motors or power cylinders 15, 16 and the source of vacuum 14 is controlled by the driver of the vehicle.

The selector shaft 145 extends downwardly through the steering column and protrudes from the lower end thereof for connection with the valve member 169, of a multi-way selector valve 13 whereof the tubular valve casing is indicated at 170 suitably mounted, as by a bracket 171, on the lower end of the steering column. The end of the selector shaft 145 is squared and has fixed thereon an arm 172 with a rounded or cylindrical end 173 received in an appropriate notch in the end of the selector valve 169 whereby rotational movement of the selector shaft 145 and the corresponding arcuate movement of the arm 172 thereon will reciprocate the valve member 169 within the valve casing 170.

The valve casing 170 is preferably cylindrical and is enlarged, as at 175, at the end remote from the selector shaft 145, and interiorly threaded to receive the coupling member 176 securing the end of a tube 177 leading to the intake manifold 14 of the internal combustion engine.

The other end of the valve casing 170 proximate the selector shaft 145 is formed with series of bosses 187, which are individually apertured as the outlet ports leading to the power cylinders effecting the shifting of the gears. Thus, the reverse port communicates through tube 189 with the rear end of the cylinder 15, i. e., with that side of the piston 52 effecting the meshing of the gears for reverse drive and the low speed port is in communication through tube 191 with the front end of cylinder 15, i. e., to that side of the piston 52 effecting meshing of the gears for the low gear ratio. The port is in communication, through tube 193, with the rear end of cylinder 16, i. e., to that side of the other piston 53 effecting the meshing of the gears for intermediate speed and the high speed port 194 communicates, through tube 195, with the front end of cylinder 16, i. e., to that side of said piston 53 effecting the meshing of the gears for high speed.

Piston construction

In the illustrated embodiment, Figure 2, the cylinder 15 or 16 is cup-shaped, say, pressed from metal and is conveniently formed with an outwardly directed peripheral flange 214 as one of cooperating locking means with the piston head 57. The periphery of the piston head 57 overlies the flange 214 and has centering means in the form of a flange 215 telescoping within the cup and a bearing 216 for the piston rod 55 or 56. The cylinder head 57 is peripherally threaded for engagement with the internal threads of an annulus 224 having an inturned flange 225 which, when the annulus is telescoped over the cylinder, engages the flange 215 and clamps the cylinder head tightly on the cylinder.

It will be noted that both cylinders 15 and 16 contain therein pistons 52, 53, respectively. Each piston comprises generally a disc or piston proper 217 carried on the reduced end of the piston rod and formed with a peripheral groove 218 for the reception of a ring-like piston spring 219, while outwardly on each face of the piston 217 are cup leathers 220 whereof the peripheries 221 are lapped inwardly over the edge of the piston and over the piston spring 219 to form a pneumatic seal, the leathers being held in position by metallic plates 222 on the outer faces of the leathers and the entire assembly being held in position on the reduced end of the piston rod by the shoulder at the inner end thereof and a nut 223 on the outer end. Thus only one piston spring is required to urge the inwardly turned ends of the cup leathers into sealing engagement with the wall of the cylinder.

Interconnection between clutch and shifter rod lock

In its preferred embodiment, the invention seeks the automatic control of the gear shifting movements. This is accomplished by retaining the shifter rods 46 and 50 against movement until the clutch is released, for instance, by interconnecting the clutch actuating devices 21 with the shifter rod locking bar 105 so that only when the clutch is released either automatically, responsive to conditions in the intake manifold of the engine or otherwise, or manually at the will of the operator, can the shifter rods 46 and 50 be released for movement and the gear shifting movements effected.

There is fixed on the clutch actuating shaft 21 an arm 22 (Figures 2, 3, 4 and 21) formed with an elongated slot 226 within which is received the pin 227 of a clevis 228 adjustably carried on the end of a link 23, the upper end of which is turned inwardly, as at 229 (Figure 3), and pivotally received within the end of the arm 93 mounted on the rock shaft 100 actuating the locking bar 105 hereinbefore described (Figures 7 and 19). The arm 93 is normally urged in a counterclockwise direction, as viewed in Figure 2, i. e., to the locking position of the locking bar 105, by means of a tension spring 230 conveniently connected to the end 229 of the link 23 and secured at its other end to some convenient part of the transmission housing 5.

Figures 7 and 21 illustrate the relation of parts when the clutch 3 is engaged and the shifter rods 46 and 50 locked by the locking bar 105 against movement. Assuming now that it is desired to shift the gears, the clutch pedal 9 may be manually depressed thereby causing the clutch actuating shaft 21 to turn in a counter-clockwise direction. This same movement may be effected responsive to a variation in sub-atmospheric pressures in the intake manifold 14 of the engine by the pneumatic motor 20 causing the rotation of the arm 231, fixed on the clutch actuating shaft 21, in a counter-clockwise direction thereby causing a similar turning of the clutch operating shaft 21. This rotation of the shaft 21 in a counter-clockwise direction carries with it the arm 22, but movement of this arm does not pick up and cause corresponding movement of the link 23 until the arm 22 has brought the lower end of the slot 226 into engagement with the pin 227 of the clevis 228 thereby causing the upward movement of the arm 93 and the unlocking of the shifter rods during the last portion of the movement of the clutch releasing devices, i. e., until just before the arm 231 reaches the dotted line position shown in Figure 21. When the clutch is to be reengaged and the clutch actuating shaft 21 turned in a clockwise direction, the movement of the arm 22 downwardly does not affect the link 23 because, so soon as the clutch actuating shaft 21 commences to move, the spring 230 draws the shifter rod locking bar lever 93 downwardly. The purpose of this construction is to insure that the clutch is fully opened before the gear shifter rods are unlocked and the gears permitted to be shifted, and hence the parts are so designed that the clutch actuating devices must move through substantially three-quarters of their movement before the shifter rods are unlocked.

Clutch control

It has been found that the conditions of sub-atmospheric pressure or vacuum in an internal combustion engine fluctuate with the load on the engine. That is, when there is no load on the engine, the downward movement of the pistons on the intake stroke increases the rarification in the intake manifold and combustion chamber. Similarly, this rarification in the intake manifold and combustion chamber increases as the throttle valve controlling the carburetor is closed. Thus, for example, when the vehicle is stationary and the engine idling, the rarification of atmosphere, or, as it is said, the vacuum in the manifold is high. If the throttle is opened, due to the inrush into the intake manifold and combustion chamber of the explosive mixture, the rarification or vacuum drops momentarily and then gradually builds up again as the pistons reciprocate. Thus, when the vehicle commences to move, first because of the opening of the throttle and then because of the load on the engine, there results a decrease in the rarification of the atmosphere or vacuum in the manifold, but as the vehicle gathers momentum, the load on the engine decreases and the vacuum increases in the manifold and explosion chambers. Advantage is taken of this fluctuation of the fluid pressure in the manifold and explosion chambers by providing a valve which is susceptible thereto and which controls the furnishing of power to motor means, for instance, controls communication between a fluid pressure actuated motor and a source of fluid pressure. In other words, when applied to the intake manifold and/or combustion chambers of an internal combustion engine or any other chamber in which the fluid pressure fluctuates, the valve is responsive to fluctuations in the vacuum and is self-opening and closing dependent upon the degree of rarefaction in the chambers.

The mechanism by which the clutch shifting movements are effected is illustrated in Figures 1, and 21 through 28, as a power actuator or servo motor 20, in which differential pressures are obtained by means of partial vacuum on one side of a piston 235, and atmospheric air or other high pressure fluid on the other side, suction for producing the desired differential pressure being shown as obtained from the intake manifold 14 (Figure 1) of the internal combustion engine 1 and the motor 20 is shown as applied to the clutch shifting element 21. The clutch shifting arm 231 is fixed on a shaft 21. This arm 231 and the shaft 21 to which it is affixed normally assumes the position shown in full lines in Figure 21, by virtue of the clutch spring (not shown) which normally urges the clutch elements into engagement. Loosely mounted on the shaft 21 is the foot pedal 9, which is normally retained in the elevated position by means of the spring 236. The foot pedal 9 has a bearing surface 237 for engagement with the arm 231. Thus, when the foot pedal 9 is depressed, the arm 231 is rotated in a counter-clockwise direction to release the clutch, but when the motor means 20, next to be described, is operated, the clutch operating shaft 21 is turned, but the foot pedal 9 does not move.

To release the clutch automatically, the clutch arm 231 is connected to motor means preferably operated by fluid pressure differential, such as the movable wall or sliding piston 235 of a vacuum cylinder 20. The piston 235 has secured thereto a piston rod 238 slidable in a bearing 239 in the removable cylinder head 240 of the cylinder 20, which piston rod 238 is connected to the end of the lever 231 by connecting means affording a lost motion connection therebetween. Such connecting means may be flexible and comprise a cable 241 passing over an idler pulley 242 for change of direction. Thus the cable 241 permits the foot pedal 9 to be depressed, thus releasing the clutch without compelling the piston 235 to move within the cylinder 20, as will be understood.

The normal position of the piston 235 is in the forward end of the cylinder 20. By the port 243 (Figure 22), controlled by the spring pressed ball valve 244, the face of the piston 235 is subjected to atmospheric pressure and an adjustable needle valve 245 (Figure 23) permits the slow escape of air through port 246 at atmospheric pressure whereby the piston may return under the influence of the clutch spring, which normally urges the clutch elements to engage. This gradual return of the piston to initial position prevents too sudden engagement of the clutch elements, which would jolt and jar the mechanism. The interior of the cylinder 20 on the side of the piston 235 remote from the bleed port 246, that is, on the face 247 of said piston, is subjected to the vacuum of the intake manifold through a port 248 connected by a flexible tube 249 to a pipe 250 which, in turn, is connected by a valve structure 19, next to be described, to a vacuum feed tube 251 leading into the intake pipe or manifold 14 of the engine 1.

Communication between tube sections 251 and 250, and hence between the motor 20, if pneumatically operated, and the suction inducing means 14, is controlled by a valve (Figure 25). This valve comprises a casing 254, having a bore or cylinder 255, preferably of constant diameter. The bore 255 is conveniently cylindrical, from manufacturing and operating considerations, as will be understood. Casing 254 may be a die casting or the like formed with a cylindrical bore 255 closed at one end by a stop plate 256 formed conveniently, centrally, with a vent 257, whereby the face 258 of the valve 259, exposed thereby, is subjected to the pressure of the atmosphere. Proximate the opposite end of the cylinder 254, the inner periphery thereof is provided with a piston stop 260 formed, conveniently, by an inwardly directed flange or bead and the end of the bore 255 on the side opposite to the vent 257 is shown as closed by a removable plug 261 serving as an adjusting screw to place under desired tension the spring 262 urging the valve 259 in one direction. Proper adjustment of the spring tension renders the valve responsive only to predetermined degrees of sub-atmospheric pressure in the intake manifold and results in correct or exact operation of the valve.

Opening into one side of the bore 255 is a port 263 to which the pipe 250 leading to the power cylinder 20 is connected. This port 263 is preferably elongated circumferentially of the bore in order that the passage through which the sub-atmospheric pressure is applied to the motor piston 235 may have an adequate cross-sectional area substantially equivalent to the cross-sectional area of the passage 250.

The side of the bore 255 opposite to port 263 is shown as formed with a by-pass passage 264 opening into a port 265 communicating with the tube 251 leading to the intake manifold 14 of the engine. By-pass 264 has two ports, one indicated at 266 leading to that bore portion within which the end of the piston 259 is exposed to the suction of the manifold, and the other port indicated at 267, opening into the bore upon the side opposite to the port 263.

The piston valve member comprises, in the illustrated embodiment, a cylindrical body portion 259 having a circular atmospheric pressure receiving flange 268 at the end nearest the vent 257 and a circular piston flange 269, which is subjected to the sub-atmospheric pressure of the intake manifold at the opposite end, and a cylindrical valve member flange 270 intermediate the two former flanges, which serves to control the communication between the motor port 263 and the source of sub-atmospheric pressure and the bleed port 271, respectively, as conditions require.

These three flanges 268, 269 and 270 are all of the same diameter and closely fit within the bore for reciprocation therein. They are greater in diameter than the cylindrical body 259 so that the spaces between the body 259 and periphery of cylinder 254, defined by the respective flanges, form passages, one passage 272 establishing communication between the ports 267 and 263, and the other passage establishing communication between port 263 and bleed port 271.

The bleed port 271 is preferably adjustable whereby air at exactly the required rate of admission and volume may be admitted to the face 247 of the piston 235 of power cylinder 20 to permit the reengagement of the clutch easily and without shock. As shown, the bleed port 271 is rectangular in outline and is covered by a disc 274 formed with a corresponding slot 275 and adjustably secured to the casing 254 by the pin and slot connection 276.

The piston valve 259 is normally urged to the position shown in Figure 25 by a spring 262 engaging the face of the piston flange 269, and seated on the spring tension adjusting screw plug 261. The spring 262 is of such strength as to effectively position the valve to close off the port 263 from port 267 at sub-atmospheric pressures greater than a predetermined minimum, and its adjustment to suit particular conditions and engines is effected by the plug 261.

In order that the operation of the device may be clearly understood, it must be appreciated that when the engine is not operating, that is, when it is at rest, the fluid pressure of the gaseous contents of the intake manifold is substantially atmospheric pressure because the intake manifold is in communication with the inlet of the carburetor. When the crank shaft is turned over, as by a self-starter, the fluid pressure in the manifold is sub-atmospheric and results from the down stroke of the piston. The sub-atmospheric pressure is increased somewhat, i. e., the suction is lessened, however, in the manifold by the inrush of air through the inlet of the carburetor, or, as is said, the vacuum is decreased. Thus, if a motor vehicle is standing and the engine is idling with the transmission gears out of mesh, the fluid pressure in the manifold may be found on a gauge to be, say, ten pounds (twenty inches of mercury). When the clutch is released, the propeller shaft connected through low gear with the engine, the clutch reengaged, and the throttle valve opened, there is a momentary increase in the fluid pressure, i. e., decrease in the vacuum, in the manifold, say, to three pounds. As the car gathers momentum, the vacuum in the manifold increases until it registers ten pounds on the gauge again. This same cycle of conditions occurs at every shift to another gear ratio. Again, when the vehicle is travelling along the level or on a down grade, it frequently happens that the momentum of the car, and hence the revolutions per minute of the propeller shaft, exceeds the speed of rotation of the crank shaft of the engine and hence, the engine being relieved of load, the vacuum in the manifold again increases. It will thus be seen that there is a condition of high vacuum in the intake manifold of the engine at times when there is no load on the engine, and at such times there is no occasion for the engine to be clutched to the propeller shaft of the vehicle. At other times, as in starting and when there is a load on the engine, the propeller shaft must be clutched to the engine and this is at a period of low vacuum in the manifold.

In accordance with this invention, the controlling valve for the servo motor is so constructed as to be actuated by the aforesaid predetermined high vacuum of the engine to open the communication between the pipes 250 and 251, that is, between the power cylinder 20 and the intake manifold 14 of the engine.

Normally, in periods of low vacuum in the manifold, the piston valve assumes the position illustrated in Figure 25. It will be observed that the manifold port 267 and the power cylinder port 263 are disposed in transverse planes so spaced as to permit the valve flange 270 to lie therebetween and cut off communication therebetween. The valve piston port 266 is disposed on the other side of the stop 260 from the valve. In this position, with the valve closing off the motor 20 to the sub-atmospheric pressure of the intake manifold, the flange 268 is closely adjacent the vent 257.

When the valve piston is disposed in the inactive position of Figure 25, with the valve 270 lying between the cylinder port 263 and the manifold port 267 and thus cutting off the power cylinder from the manifold 14, the cylinder port 263 and a bleed port 271 are both uncovered and in communication so that atmospheric pressure is admitted to the power cylinder permitting the power cylinder to be returned by the clutch spring to the inactive position. This condition obtains so long as the vacuum in the manifold is below a predetermined maximum.

When the vacuum in the manifold rises to or above a predetermined value, the reduction in fluid pressure on the piston face 269 permits atmospheric pressure, acting through vent 257 on the face 258 of flange 268, to overcome the force of the spring 262 and the valve piston is moved downwardly, as viewed in Figure 25, until stopped by the piston stop 260.

In such position, the valve 270 lies between the bleed port 271 and the power cylinder port 263 cutting off the power cylinder 20 from atmosphere. Ports 263 and 267 both, however, open into valve passage 272 and are thus in communication, and the higher vacuum of the manifold is applied to the cylinder 20 and permits atmospheric pressure through port 248 to force the piston 235 rearwardly to actuate the shifting member 231. When the vacuum drops in the manifold, the spring 262 again forces the piston valve 259 upwardly, to the position shown in Figure 25, and puts the power cylinder 20 in communication with the bleed port 271 and thus admits atmospheric pressure to cylinder 20 to faciliate the return of the piston 235 under the influence of the clutch spring (not shown) and the reengagement of the clutch.

In some situations, it may be found desirable to render inoperative the automatic control of the fluid pressure operated motor 20. To this end, provision is made for locking the valve 259 in inoperative position by cut-out devices, shown in Figures 24, 25 and 27.

The pressure flange 268 is conveniently provided with a plunger rod or extension 280 protruding through the vent 257. The plunger rod 280 has a head 281 of increased diameter. A bifurcated locking member 282, 283 is pivoted at 284 on the end plate 256, the arms 282 extending on either side of the rod 280 and adapted to engage the underneath side of the enlarged head 281 so that when the locking member 282, 283 is rocked about its pivot 284 in a clockwise direction, the rod will be drawn upwardly raising the valve to the extreme position shown in Figure 25, and holding it there and thus rendering the valve inoperative so long as it is held in that position. Movement of the locking member and its retention in operative position is effected by a rod, Bowden wire, link or the like 285, extending from the end of the arm 283 through the dash 2 and through the instrument panel 286 and terminates in an enlarged head 287 for engagement and manipulation by the operator of the vehicle. Thus when the operator pulls the rod 285 rearwardly, the valve 259 is locked in inoperative position. It is held so locked in any convenient manner. As shown, a leaf spring locking detent 288 is carried with a guide cylinder or sleeve 289 which detent moves into a recess (not shown) in the operating rod 285 and yieldingly engages the rod and retains it in adjusted position and at the same time permits the rod 285 to be freely moved by the operator.

Operation

The operation of the device is as follows:

Let it be assumed that the motor vehicle is standing, for instance, at the curb, the engine 1 not running. The engine is started. This causes the vacuum to increase in the intake manifold 14, thereby reducing the pressure in the by-pass 264 of the valve 19 (Figure 25) and enabling atmospheric pressure on the exposed face 258 of the valve member 268 to overcome the force of the spring 262 and open communication to the clutch control power cylinder 20 exposing the rear face 247 of the piston 235 (Figure 21) to the sub-atmospheric pressure of the intake manifold and permitting atmospheric pressure through the bleed port 243 to force the cylinder rearwardly, thereby drawing the arm 231 upwardly to release the clutch 3. This movement of the clutch actuating devices moves the shifter rod locking bar 105 (Figure 19) to release the shifter rods.

The selector lever 12 is then moved to low gear position, thereby moving the valve 13 to evacuate the power cylinder 15 forwardly of the piston moving the selected shifter rod 50 (Figure 7) from its neutral position. This compresses the neutralizing spring 74 thereon and also moves the drift lock 122 to lock the other shifter rod 46 in inoperative or neutral position during the first portion of the movement of the shifter rod 50. Further movement of the piston of cylinder 15 causes the gear shifter fork 49 to engage the gears 37 and 38 in low gear ratio and brings the groove 113 (Figure 9) in register with the raceway so that the detent ball 109 may drop therein.

The accelerator is then depressed to open the throttle which reduces the vacuum in the intake manifold allowing the valve spring 262 to close the clutch control valve thereby permitting the clutch spring to reengage the clutch. During the early part of the movement of the clutch actuating devices, the connection 22, 23 between the clutch actuating devices and the shifter rod lock moves the locking bar 105 to locking position (Figure 7) to lock both shifter rods by means of the detents 109, 110 in the position they have attained, thereby to resist the tendency of the compressed neutralizing spring 74 to move the shifter rod 50 to neutral position until the clutch is again disengaged.

After the vehicle is in motion in low gear, the selector lever 12 may be set for drive in intermediate gear, at II. The rear side of the piston 53 of the other cylinder 16 (Figure 2) is thus evacuated operating the shifter rod 46 which, up to this time has been locked in neutral position by the drift lock 122 and held in neutral also by the action of the clutch lock 105. When the engine throttle is closed, thus increasing the vacuum in the manifold, the clutch will be caused to be disengaged, as previously explained and in moving from engaged to disengaged position, will unlock the shifter rods. The compressed neutralizing spring 74 of the shifter rod 50 which had been previously moved into low gear position then moves the shifter rod 50 back to an exact neutral position, releasing the other shifter rod by movement of the drift lock and allowing the piston 53 in the cylinder 16 that is now selected to move the shifter rod 46 to the position of intermediate gear ratio. On reaching neutral, with the recesses 98 and 115 in the same transverse plane, the drift lock spring 132 throws the drift lock to a neutral position. Then movement of the other shifter rod 46 to intermediate position cams the lug over to the opposite slide, thus locking the shifter rod 50 in neutral and continuing movement of the shifter rod 46 compressing its neutralizing spring 74 until it reaches its designated position when it is now in second gear.

Then when the driver depresses his accelerator pedal, the clutch is again moved to its engaged position and thereby in its passage locks the shifter rods in their newly attained position, as shown in Figure 11.

The shift to high gear ratio follows the same procedure.

Sometimes an inexperienced driver will permit the engine to be too heavily loaded before increasing the power by changing to a lower gear. This will have resulted in so reducing the vacuum in the intake manifold due to the extreme load on the engine that there will not be enough vacuum to operate either clutch control or gear shift. In this situation, the manual operation of the clutch pedal to clutch releasing position will so relieve the engine of its load that the vacuum will immediately increase to such an extent that the gear shifting cylinders may be operated by vacuum, as well as the clutch cylinder.

At times there are conditions when the vacuum is so low in the intake manifold as not to be high enough to offset the counteraction of the neutralizing springs 74 functioning to bring the shifter rods back to neutral. To prevent such action taking place while the engine is running or the vehicle is moving, the check valve 180, placed at the supply end of the selector valve 13, will close, by its spring pressure, thus preventing the cylinder, whose piston has moved the shifter rod into gear, from bleeding on the other side of the piston to thereby allow the piston to return to neutral position by the spring action. This is notably so when travelling at a high rate of speed in high gear. At a high rate of speed, the vacuum in the manifold may be reduced to such an extent as not to be enough to overcome the action of the shifter rod neutralizing springs, and without the check valve, the gears would fly out of mesh and immediately attempt to return into mesh while the clutch was engaged at such times as the sub-atmospheric pressure momentarily attains a high degree. This is again experienced when low gear ratio is selected while the clutch is held in release, because the car is not in motion and the vacuum has been reduced down to the extreme idling of the engine. In such situations, the neutralizing springs of the shifter rods tend to gradually push the gears out of mesh. Here, if the operator, thinking that his gears were in mesh, opened the engine throttle, the vacuum would mount to such an extent that it would again return the gears to their meshed position with the resulting clashing of gears. Here again, the check valve functions to prevent such an occurrence.

In case of backfire of the engine, the check valve also prevents the backfire from travelling back into the selector valve, which would, in time, cause the same to become fouled.

It will thus be seen that a transmission is provided for motor vehicles in which the shifting of the gears is wholly automatic in the sense that the operator of the vehicle need only manipulate a selector handle on, say, the steering wheel, and the engine throttle and the gearing is released or unlocked for shifting movements upon predetermined conditions of load on the engine. Either preselection or post selection of the desired gear ratio is possible.

The invention is illustrated as applied to motor means adapted to actuate or shift the clutch releasing lever and/or gear shifting devices in an automotive vehicle, but it will be readily apparent that the invention is equally applicable to any sort of controlling instrumentality for any purpose and is operable by any source of fluid pressure in which the fluid pressure fluctuates. In the illustrated embodiment, the fluctuating fluid pressure existing in the intake manifold and explosion chambers of an internal combustion engine is the source, but broadly, any source of rarefied atmosphere will be contemplated and in such broad aspect will be referred to as a chamber in which the fluid pressure fluctuates, or as suction inducing means. Also, any kind of motor to effect a shifting movement may be used. It will also be obvious that the pressure differential may be obtained by differences in fluid pressure, such as the difference in effect of fluid under pressure on the one hand and lower degree of fluid pressure on the other.

Various modifications will occur to those skilled in the art in the disposition and character of the various component elements going to make up the invention as a whole as well as in the selection and combination of the several interrelated features. Certain of the component elements are capable of independent use as well as use in combination with each other. No limitation is intended by the phraseology of the foregoing specification or illustrations in the accompanying drawings, except as indicated in the appended claims.

What is claimed is:—

1. In a controlling device for a pneumatically operated motor, the combination with an internal combustion engine having suction inducing means, a pneumatically operated motor operatively connected with a shifting member and connected in communicating relation with the suction producing means whereby the motor is subjected thereto, of a casing, a valve movable therein between two extreme positions, said valve having at least two faces directed in opposite directions, said casing being formed with a vent exposing one face to atmospheric pressure, means carried with said member and extending through the vent, a rocking member having means engaging the extending means, means rocking the rocking member to hold the valve against movement, a conduit connecting the motor with a port on the interior of the casing controlled by said member, spaced ports on the interior of the casing, one of which exposes the other faces to suction, a conduit between said last named ports and the suction producing means and yielding means opposing the atmospheric pressure on said face.

2. In a controlling device for a pneumatically operated motor, the combination with an internal combustion engine having an intake pipe, a pneumatically operated motor operatively connected with a shifting member and connected in communicating relation with the intake pipe whereby the motor is subjected to the fluid pressure of the intake pipe, of a casing, a valve movable therein between two extreme positions, said valve having three circular flanges, the faces of two of which are directed in opposite directions, said casing being formed with an aperture exposing the one face to atmospheric pressure, means carried with said member and extending through the vent, a rocking member having means engaging the extending means, means rocking the rocking member to hold the valve against movement, a conduit connecting the motor with a port on the interior of the casing, spaced ports on the interior of the casing to expose opposed faces of another flange and the intermediate flanges to the fluid pressure of the intake pipe, an adjustable bleed port in the chamber, said first named flange and intermediate flanges defining a passage which in one position of the valve connects the first named port and one of the second named ports, said intermediate flange and said another flange defining a second passage which in another position of the valve connects the first named port with the bleed port, a passage between said last named ports, a conduit between the passage and the intake pipe and an adjustable spring opposing the atmospheric pressure on the member.

3. In a controlling device for a pneumatically operated motor comprising a casing, a port therein communicating with the motor, spaced ports therein communicating with a chamber in which sub-atmospheric pressure fluctuates and an adjustable bleed port therein, a member movable therebetween at least two positions, said member having two oppositely disposed faces, means to expose one of said faces to sub-atmospheric pressure through one of said spaced ports, a vent to expose the other face to atmospheric pressure and means to apply a predetermined force to said member acting in the direction opposite to the force of atmospheric pressure, said member being formed with communicating means establishing communication between the first named port and the other spaced port in one position and between the first named port and the bleed port in a second position.

4. In a controlling device for a pneumatically operated motor comprising a casing, a port therein communicating with the motor, spaced ports therein communicating with a chamber in which sub-atmospheric pressure fluctuates, and an adjustable bleed port therein, a member movable therein between at least two positions, said member having two oppositely disposed faces, means to expose one of said faces to sub-atmospheric pressure through one of said spaced ports, a vent to expose the other face to atmospheric pressure, and means to apply a predetermined force to said member acting in the direction opposite to the force of atmospheric pressure, said member being formed with a passage establishing communication between the first named port and the other spaced port in one position and a passage establishing communication between the first named port and the bleed port in a second position.

5. In a device of the character described, the combination with a transmission, of a plurality of spaced parallel power actuated shifter rods, means to lock the respective shifter rods in a plurality of positions, and a pair of pneumatically actuated means operably distinct from each other, one for each shifter rod for moving its associated rod from a fixed neutral into a locked operative position, a pair of springs, one for each shifter rod and in direct bearing engagement with one end of its associated rod, the other end being free of any springs, each spring being energized by the shifting of its companion rod into said operative position and each spring operable on release of the associated locking means to restore its rod to its neutal position and one of the locking means associated with each rod constituting a stop for locking the shifter rod automatically as the rod reaches such neutral position.

6. In a device of the character described, the combination with a transmission, of a plurality of spaced parallel power actuated shifter rods, a single clutch locking means to lock the respective shifter rods in a plurality of positions automatically whenever a rod reaches any one of such positions, and power storing means engaging the shifter rods to return them to a predetermined position, said means including a single spring for each rod energized by a movement of the associated rod in either axial direction from the neutral position of the rod.

7. In a device of the character described, the combination with a transmission, of a plurality of spaced parallel power actuated shifter rods, automatically actuated means to lock the respective shifter rods in a plurality of positions on arrival in each of such positions, and power storing means carried with the shifter rods and including one spring for each rod, each spring being loose on one end of its associated rod and fixed stops at opposite ends of each spring, wherein power is stored by movement of the shifter rods in either direction to return said shifter rods to a predetermined position.

8. In a device of the character described, the combination with a transmission, of a plurality of spaced parallel power actuated shifter rods, means to lock the respective shifter rods in a plurality of positions, spaced abutments carried with the respective shifter rods, spring seats slidably carried with the respective shifter rods between said abutments, coil springs surrounding the shifter rods, respectively, between the spring seats, and spaced fixed abutments with respect to which the shifter rods move and which are selectively engaged by the spring seats as the rods reciprocate to compress the springs whereby power is stored in the springs to return the shifter rods to a predetermined position.

9. In a device of the character described, the combination with a transmission, of a plurality of spaced parallel power actuated shifter rods, means to lock the respective shifter rods in a plurality of positions, spaced abutments carried with the respective shifter rods, spring seats slidably carried with the respective shifter rods between said abutments, coil springs surrounding the shifter rods, respectively, between the spring seats, spaced fixed abutments with respect to which the shifter rods move and which are selectively engaged by the spring seats as the rods reciprocate to compress the springs whereby power is stored in the springs to return the shifter rods to a predetermined position and stops limiting the reciprocation of the shifter rods.

10. In a device of the character described, the combination with a transmission, of a plurality of spaced parallel power actuated shifter rods, means to lock the respective shifter rods in a plurality of positions, comprising detents received in spaced peripheral grooves formed in the shifter rods, spaced abutments carried with the respective shifter rods, spring seats slidably carried with the respective shifter rods between said abutments, coil springs surrounding the shifter rods, respectively, between the spring seats, and spaced fixed abutments with respect to which the shifter rods move and which are selectively engaged by the spring seats as the rods reciprocate to compress the springs whereby power is stored in the springs to return the shifter rods to a predetermined position.

11. In a device of the character described, the combination with a transmission and a cover plate therefor formed with shifter rod chambers, of a plurality of spaced parallel power actuated shifter rods in the respective chambers and protruding from one corresponding end thereof, a return spring housing carried with the cover plate into which the ends of the shifter rods extend, means to lock the respective shifter rods in a plurality of positions, spaced abutments carried with the respective shifter rods, spring seats slidably carried with the respective shifter rods between said abutments, coil springs surrounding the shifter rods, respectively, between the spring seats, spaced fixed abutments with respect to which the shifter rods move and which are selectively engaged by the spring seats as the rods reciprocate to compress the springs whereby power is stored in the springs to return the shifter rods to a predetermined position and stops carried with the cover plate and housing, respectively, and limiting the reciprocation of the shifter rods.

12. In a device of the character described, in combination with a transmission and a cover plate therefor formed with shifter rod chambers open at one end, of a plurality of spaced parallel power actuated shifter rods disposed in the chambers, respectively, and protruding from the open ends, means to lock the respective shifter rods in a plurality of positions, respectively, and comprising detents received in spaced peripheral grooves in the shifter rods, the protruding end of each shifter rod being of reduced diameter to form a shoulder, a slidable collar carried on the reduced end of each shifter rod and slidable thereon, the reduced end of each shifter rod being formed with a groove, a split ring in the groove as a limit stop for the collar, spring seats slidable on the reduced end of each shifter rod between the shoulder and the collar, coil springs surrounding the reduced ends between the spring seats, respectively, a return spring housing carried with the end of the cover plate within which the reduced end of the shifter rods extend, opposed stops in the cover plate and housing, respectively, to limit the reciprocation of the shifter rods, abutments carried with the cover plate for engagement by the respective collars, the end of the cover plate and the last named abutments being selectively engaged by the spring seats and collars as the rods reciprocate to compress the springs whereby power is stored therein to return the shifter rods to neutral position.

13. In a device of the character described, the combination with at least two reciprocating parallel transmission shifter rods formed with locking recesses, a clutch controlled reciprocable locking bar disposed in parallel relationship therewith and in a plane thereabove and whereof the axis lies in a plane perpendicular to the plane including the axes of the shifter rods and passing therebetween said locking bar being formed with a recess and a plurality of balls, movable to extend partly into the recess in the locking bar and movable to extend partly into the recesses in the shifter rods, respectively.

14. In a device of the character described, the combination with suction producing means, clutch actuating means, motor means operatively connected thereto, gear shifting means, at least one motor means operatively connected to the gear shifting means, manually actuated means controlling communication between the suction producing means and the last named motor means, locking means for the gear shifting means rendered inoperative by the clutch actuating means and means controlling the operation of the first named motor means, said last named means adapted to be operatively actuated automatically by a predetermined difference in pressure between the external atmospheric pressure and the suction produced by said suction producing means and a manually actuated control for securing said automatic means in an inoperative position.

15. In a device of the character described, the combination with transmission shifter rods, means to lock said shifter rods in selected positions, pressure means including a lost-motion linkage for holding the shifter rods in selected positions operative after a predetermined movement of said pressure means, a control for said last named means operable automatically on certain changes in its operable pressure and means for locking said last named means in an inoperative position.

16. In a device of the character described, the combination with transmission shifter rods, means to lock said shifter rods in selected positions, engine controlled means providing a source of subatmospheric pressure, a power cylinder actuated by a predetermined difference in pressure between the pressure in said source and atmospheric pressure, operative connections between the engine controlled power cylinder and the locking means comprising a lost motion connection.

17. In a device of the character described, the combination with an internal combustion engine having a manifold and gear shifting means, of means to lock said gear shifting means, motor means responsive to a certain difference in pressure between atmospheric pressure and the subatmospheric pressure in the intake manifold, operative connections between the locking means and the motor means comprising delayed acting means and valvular means for controlling the admission of pressure from the intake manifold to said motor means and responsive to certain fluctuations in said subatmospheric pressure in the intake manifold.

18. In a device of the character described, the combination with gear shifting means and clutch actuating means, a conduit for supplying fluid pressure to actuate the clutch actuating means, a control in said conduit responsive to automatically occurring pressure differentials in said fluid pressure to control the pressure flow actuating the clutch actuating means, means to lock the gear shifting means in selected positions and operative connections between the clutch actuating means and locking means comprising a lost motion connection.

19. In a device of the character described, the combination with an internal combustion engine having a throttle and clutch actuating means, of means to lock the gear shifting means, clutch actuating means, operative connections between the clutch actuating means and the locking means and means including a control responsive only to a predetermined subatmospheric pressure and disposed in one operative position to open the clutch actuating devices directly to the intake manifold of the engine thereby under such conditions to control the clutch operating means from the throttle when all other driving conditions affecting the pressure in the engine manifold are the same.

20. In an automatic gear shifting transmission, in combination, gear shifting shifter rods slidable to bring different ratio gearing into mesh, a return spring acting on each shifter rod and normally urging the same to a neutral position, a shifter fork carried with each shifter rod, a power cylinder having a piston and piston rod therefor, a connection between the end of the cylinder remote from the piston rod and the transmission casing, a rock shaft journalled in the transmission cover plate, an arm fixed thereon outwardly of the case and connected with the end of the piston rod, an arm fixed on the rock shaft inwardly of the case and connected with the shifter fork and means to selectively apply sub-atmospheric pressure to one side of a selected piston and atmospheric air to the other side thereof and to both sides of the other piston.

21. In an automatic gear shifting transmission, in combination, gear shifting shifter rods slidable to bring different ratio gearing into mesh, a return spring acting on each shifter rod and normally urging the same to a neutral position, a shifter fork carried with each shifter rod, a power cylinder having a piston and piston rod therefor, a rock shaft journalled in the transmission cover plate, an arm fixed thereon outwardly of the case and connected with the end of the piston rod, an arm fixed on the rock shaft inwardly of the case and connected with the shifter fork and means to selectively apply sub-atmospheric pressure to one side of a selected piston and atmospheric air to the other side thereof and to both sides of the other piston.

22. In an automatic gear shifting transmission, in combination, gear shifting shifter rods slidable to bring different ratio gearing into mesh, a return spring acting on each shifter rod and normally urging the same to a neutral position, a shifter fork carried with each shifter rod, power cylinders corresponding in number to the number of shifter rods, each having a piston and piston rod, rock shafts corresponding in number to the number of shifter rods, each journalled in the transmission cover plate, an arm fixed on each rock shaft outwardly of the case and pivotally connected with the end of a piston rod, an arm fixed on the rock shaft inwardly of the case and pivotally connected with a shifter fork and means to selectively apply sub-atmospheric pressure to one side of one piston and atmospheric air to the other side thereof and to both sides of the other piston.

23. In an automatic gear shifting transmission, in combination, gear shifting shifter rods slidable to bring different ratio gearing into mesh, a return spring acting on each shifter rod and normally urging the same to a neutral position, a shifter fork carried with each shifter rod, corresponding in number to the number of shifter rods and each having a piston and piston rod, rock shafts corresponding in number to the number of shifter rods and journalled in the transmission cover plate, operative connections between each rock shaft and piston rod, operative connections between each rock shaft and shifter fork and means to selectively apply pressure differential to one piston.

24. A leakproof cover plate for an automatic gear shifting transmission casing comprising a plurality of parallel shifter rod bores, each closed at one end and open at the other, shifter rods disposed in the bores, respectively, and protruding from the open ends, return devices engaging the protruding ends of the shifter rods and a housing enclosing the protruding ends of the shifter rods and carried with the cover plate.

25. A leakproof cover plate for an automatic gear shifting transmission casing comprising a plurality of parallel shifter rod bores, each closed at one end and open at the other, shifter rods disposed in the bores, respectively, and protruding from the open ends, return devices engaging the protruding ends of the shifter rods, a housing enclosing the protruding ends of the shifter rods and carried with the cover plate and operating devices for the shifter rod disposed within the cover plate.

26. In an automatic gear shifting device, in combination, a transmission, shifter rods thereof, motor means actuating each shifter rod, clutch actuating means, motor means operating said clutch actuating means, locking means for the shifter rods controlled by the clutch actuating means, manual means selectively controlling the shifter rod motor means and means controlled by the engine for supplying reduced pressure fluid to one side of the clutch actuating means, means for supplying actuating atmospheric pressure to the other side, a control valve for governing the supply of said reduced pressure fluid and adapted in one position of the valve to open communication between the engine manifold and said clutch actuating means.

27. In an automatic gear shifting device, in combination, a transmission case, cover plate, a plurality of shifter rods movable therein, pneumatic cylinders having pistons and piston rods therefor, said pneumatic cylinders being in number equal to the number of shifter rods, operable connections between the piston rods and shifter rods, respectively, said cylinders being carried on the side of the transmission case.

28. In a device of the character described, a plurality of shifter rods, spring means acting directly on the shifter rods, respectively, to return them to initial position, detent mechanism for holding said rods against movement, said mechanism being adapted to engage said rods intermediate their ends and means actuated by the movement of one of said rods for holding the detent mechanism in operative position to restrain movement of the other rod, said means acting to resist moving pressure on said detent mechanism independently of said first-named rod.

29. In a device of the character described, a housing, a plurality of shifter rods mounted in the housing, spring means acting directly on the shifter rods, respectively, to return them to initial position, detent mechanism to engage said rods intermediate their ends and retain them against movement, and means movable by the movement of one of said rods into position between the detent mechanism and the housing to positively restrain movement of the other rod.

30. In a device of the character described, a housing, a plurality of shifter rods mounted in the housing, spring means acting directly on the shifter rods, respectively, to return them to initial position, detent mechanism to engage said rods intermediate their ends and retain them against movement, and means movable by one of said rods into position to hold said detent mechanism in retaining engagement with the other rod, and means whereby a moving force applied to said second rod will be resisted by said housing.

31. In a device of the character described, a housing, a plurality of shifter rods mounted in said housing, spring means acting directly on the shifter rods, respectively, to return them to initial position, a detent engaging each of said rods, and a retaining member moved by the movement of one of said rods into position between the detent of the other rod and the housing to retain said second-named rod against movement whereby pressure on said detent is transmitted through said member to the housing.

32. In a device of the character described, a housing, a plurality of shifter rods mounted in said housing, spring means acting directly on the shifter rods, respectively, to return them to initial position, a detent engaging each of said rods, and means acting between said detents to hold them in position to retain the rods against movement, said means comprising a member movably mounted in the housing, and adapted to be moved by the movement of one rod into a position between the housing and the detent of the other rod whereby moving pressure on the last-named rod will be resisted by the housing.

33. In a device of the character described, a housing, a plurality of shifter rods mounted in said housing, spring means acting directly on the shifter rods, respectively, to return them to initial position, a detent engaging each of said rods, and means acting upon said detents to hold them in position to retain the rods against movement, said means comprising a member pivoted in the housing and adapted to be moved into and released from operative position with the detent of one rod by movement of the other rod, and a spring to return said member to inoperative position when released.

34. In a device of the character described, a housing, a plurality of shifter rods mounted in said housing, spring means acting directly on the shifter rods, respectively, to return them to initial position, a detent engaging each of said rods, intermediate its length, and means acting between said detents and the housing to hold them in position to retain the rods against movement, said means being moved into and released from operative position with respect to one rod by the movement of the detent for the other rod.

35. In a device of the character described, a housing, a plurality of shifter rods mounted in said housing, spring means acting directly on the shifter rods, respectively, to return them to initial position, a detent engaging each of said rods, and means acting between said detents to hold them in position to retain the rods against movement, said means comprising a member pivoted in the housing and adapted to be moved into and released from operative position with the detent of one rod by movement of the detent for the other rod.

36. In a device of the character described, a housing, a plurality of shifter rods mounted in said housing, spring means acting directly on the shifter rods, respectively, to return them to initial position, a detent engaging each of said rods, and means acting upon said detents to hold them in position to retain the rods against movement, said means comprising a member pivoted in the housing and adapted to be moved into and released from operative position with the detent of one rod by movement of the other rod, and a spring operative to return said member to neutral position when moved in either direction about its pivot.

37. In a shifter rod controlling device, a housing, a plurality of movable rods mounted therein, spring means acting directly on the shifter rods, respectively, to return them to initial position, a ball detent in engagement with each of said rods, a retaining member pivoted on the housing and adapted to be swung into engagement with either of said detents, said detents being adapted to be moved toward said retaining member by the movements of the respective rods, and a single spring engaging said retaining member to return it to neutral position after being engaged with either detent.

38. In a shifter rod controlling device, a housing, a plurality of rods movably mounted therein, spring means acting directly on the shifter rods, respectively, to return them to initial position, a ball detent in engagement with each of said rods, a rocker pivotally mounted in said housing and having a portion at one side of its pivot lying between said balls, said rocker being adapted to be moved into engagement with one of said balls when the other thereof is moved by movement of the respective rod, said rocker being provided with spaced arms upon the other side of the pivot thereof, and a spring mounted in the housing and acting against said arms to urge said rocker toward neutral position when the rocker is moved in either direction.

39. In a shifter rod controlling device, a housing, a plurality of rods movably mounted therein, spring means acting directly on the shifter rods, respectively, to return them to initial position, a ball detent in engagement with each of said rods, a rocker pivotally mounted in said housing and having a portion at one side of its pivot lying between said balls, said rocker being adapted to be moved into engagement with one of said balls when the other thereof is moved by movement of the respective rod, and resilient means acting upon said rocker to return it to neutral position regardless of the direction in which it is moved.

40. In a shifter rod controlling device, a housing, a plurality of rods mounted therein, spring means acting directly on the shifter rods, respectively, to return them to initial position, a detent releasably engaging each of said rods, a rocker pivotally mounted in the housing and having a portion at one side of its pivot lying beween said detents, said rocker being adapted to be moved into engagement with one of the detents when the other is moved by movement of the respective rod, and spring means to return said rocker to its normal position between said detents.

41. An interlock for gear shifting slip rods comprising, in combination, a source of sub-atmospheric pressure, a plurality of spaced parallel power actuated shifter rods having complementary recesses corresponding to several positions of the shifter rods, spring means carried by and acting directly on the shifter rods, respectively, to return them to initial position, locking means adapted to engage in the recesses, respectively, and means responsive to variations in the sub-atmospheric pressure to cause said locking means to enter said recesses.

42. An interlock for gear shifting slip rods comprising, in combination, a source of sub-atmospheric pressure, a plurality of spaced parallel power actuated shifter rods having complementary recesses corresponding to the several positions of the shifter rods, spring means carried by and acting directly on the shifter rods, respectively, to return them to initial position, movable members adapted to engage in the recesses, a reciprocable slide moving said members into engagement with said recesses in one position of its movement, and means responsive to variations in the sub-atmospheric pressure to reciprocate said slide.

43. An interlock for gear shifting slip rods comprising, in combination, a source of sub-atmospheric pressure, a plurality of spaced parallel power actuated cylindrical shifter rods having complementary recesses corresponding to the several positions of the shifter rods, spring means carried by and acting directly on the shifter rods, respectively, to return them to initial position, a pair of movable means adapted to engage in the grooves, a reciprocating member to move said movable means into the grooves and means responsive to variations in the subatmospheric pressure to reciprocate said member.

44. In a device of the class described, in combination a shifter rod, means to lock the shifter rod, a shifter motor, a chain of connected parts including a lost motion device between the shifter motor and the locking means, a pedal acting on said chain to shift the locking means and simultaneously to intercept the operative connection between the locking means and the motor whereby the motor piston is free to move idly, an engine for generating a source of reduced pressure and a conduit including valvular means operable on a prefixed difference in pressure between the engine pressure and atmospheric pressure for controlling the admission of engine pressure to the shifter motor.

45. In a device of the class described, the combination of an internal combustion engine having a manifold and gear shifting means, a pneumatic motor having both sides of its piston exposed to and actuated by the reduced pressure condition in the manifold, means for selectively exposing either side of the piston to the manifold, said motor having its piston coupled to the gear shifting means to move the same selectively in either axial direction into a gear shifted position from a neutral position, spring means acting on the gear shifting means tending to reset the same and the motor piston into their normal neutral position when the motor is free of the controlling pressure from the intake manifold, means for locking the gear shifting means in its gear shifted position including a sliding locking bar provided with a groove, a rock shaft provided with an arm engaging in said groove to shift the locking bar as the shaft is rocked, a second pneumatic motor of the differential type having one side open to the intake manifold and its other side open to the atmosphere, and connecting means between the piston of said second motor and said rock shaft for moving the locking means into an inoperative position, said connecting means including a lever arm, a flexible cable connected to one end of the arm, a spring acting on the rock shaft tending to set the locking means in locked position and tending to create a slack in the flexible cable.

46. In a device of the character described, the combination with a gear shifting means, a spring acting thereon and tending to maintain said means in a neutral position, a pressure motor for shifting said means selectively into either one of the two gear connecting positions against the resistance of said spring, means to lock said gear shifting means in both of its gear shifted positions, a clutch actuating shaft provided with two arms, delayed acting means between one of the arms and said locking means, a differential pressure motor operatively connected to the other arm for controlling the locking means, a source of pressure different from the atmospheric pressure and adapted to be open to one side of the differential motor piston and selectively to one of the two sides of the gear shifting motor to control the operation of said motors, the differential pressure motor having a bleeding port placing the other side of the piston in fluid communication with the external atmosphere and a clutch pedal pivoted to the clutch shaft and adapted to bear on the first named arm whereby the moving of the clutch pedal to disconnect the clutch will simultaneously dispose the differential motor in an inoperative position out of control of the locking means.

47. In a device of the character described, the combinaton of gear shifting means including a selector shift rod, a spring at one end thereof tending to maintain the same in a neutral position, a pneumatic motor connected to the shift rod to move the same selectively in both directions from its neutral position against the tension of said spring, locking means including a sliding locking bar for securing the shift rod in its several positions, a lock controlling pneumatic motor, a chain of connected parts operatively connecting the motor to the locking bar for shifting the same, said parts including a clutch actuating shaft, a system of levers between the shaft and locking bar, and said parts also including a lever secured to said shaft and connected to the piston of the lock controlling motor and a clutch lever for turning the shaft independently of the lock controlling motor.

48. In a device of the character described, the combination with gear shifting means including a shift rod, means for locking the rod, a clutch actuating shaft, a linkage between the shaft and the locking means including a delayed acting means, a foot pedal carried by the shaft and adapted for shifting the locking means into an unlocked position following the moving of the clutch into a fully unclutched position, engine controlled means for creating a source of subatmospheric pressure, a motor having one side of its piston exposed to atmospheric pressure and the other side adapted to be exposed to said source, connecting means between the piston and said shaft also for shifting the locking means into an unlocked position of the clutch into an unclutched position whereby the gears may be shifted when the clutch is disconnected either by manual action on the pedal or automatically by virtue of a reduced pressure condition in the engine.

ALBERT A. HODGKINS.